(12) United States Patent
Galati et al.

(10) Patent No.: US 10,940,622 B2
(45) Date of Patent: Mar. 9, 2021

(54) VALVE PIN POSITION AND VELOCITY CONTROL METHOD AND APPARATUS

(71) Applicant: Synventive Molding Solutions, Inc., Peabody, MA (US)

(72) Inventors: Vito Galati, Rowley, MA (US); Lin Yang, Lynnfield, MA (US)

(73) Assignee: Synventive Molding Solutions, Inc., Peabody, MA (US)

( * ) Notice: Subject to any disclaimer, the term of this patent is extended or adjusted under 35 U.S.C. 154(b) by 333 days.

(21) Appl. No.: 15/953,904

(22) Filed: Apr. 16, 2018

(65) Prior Publication Data

US 2018/0264701 A1 Sep. 20, 2018

Related U.S. Application Data

(63) Continuation of application No. PCT/US2015/023229, filed on Mar. 20, 2018.
(Continued)

(51) Int. Cl.
*B29C 45/00* (2006.01)
*B29C 45/76* (2006.01)
*B29C 45/28* (2006.01)

(52) U.S. Cl.
CPC ........ *B29C 45/7613* (2013.01); *B29C 45/281* (2013.01); *B29C 2045/2824* (2013.01);
(Continued)

(58) Field of Classification Search
CPC ........ B29C 45/281; B29C 2945/76568; B29C 2945/76083; B29C 2045/2824
See application file for complete search history.

(56) References Cited

U.S. PATENT DOCUMENTS 8,375,579 B2   2/2013   Deriche
8,597,019 B2  12/2013   Deriche
(Continued)

FOREIGN PATENT DOCUMENTS

EP   1899134        3/2008
EP   2433774 B1     3/2012
(Continued)

OTHER PUBLICATIONS

International Search Report and Written Opinion in corresponding PCT application, PCT/US2018/023229, dated Jun. 18, 2018.
(Continued)

*Primary Examiner* — Jacob T Minskey
*Assistant Examiner* — Adrien J Bernard
(74) *Attorney, Agent, or Firm* — Polsinelli. PC

(57) ABSTRACT

Injection molding system having a flow control apparatus and method that controls the movement and/or rate of movement of a valve pin over the course of an injection cycle to cause the pin to move to one or select positions and/or to control the rate of movement of the pin over the course of the injection cycle. In one embodiment the method includes steps of:

a) first controllably operating the actuator to drive the valve pin upstream beginning from the first closed position (50) to be moved to and held in a first selected position (51) for a first selected period of time during the course of an injection cycle, the first selected position (51) being the full open position;

b) second controllably operating the actuator to drive the valve pin, during the injection cycle, downstream beginning from the first selected position (51) to be moved to and held in a second closed position (52) for a second selected period of time;

c) third controllably operating the actuator to drive the valve pin, during the injection cycle, upstream beginning from
(Continued)

the second closed position (52) to be moved to and held in a second selected position (53) for a third selected period of time, the second selected position being an intermediate position or the full open position; and d) fourth controllably operating the actuator to drive the valve pin, during the injection cycle, downstream beginning from the second selected position (53) to be moved to a third closed position (54).

11 Claims, 24 Drawing Sheets

Related U.S. Application Data

(60) Provisional application No. 62/473,681, filed on Mar. 20, 2017.

(52) U.S. Cl.
CPC ............ *B29C 2045/2865* (2013.01); *B29C 2945/76083* (2013.01); *B29C 2945/76551* (2013.01); *B29C 2945/76568* (2013.01)

(56) References Cited

U.S. PATENT DOCUMENTS

| | | |
|---|---|---|
| 8,641,943 B1 | 2/2014 | Kipe |
| 2011/0236526 A1 | 9/2011 | Deriche |
| 2012/0100242 A1 | 4/2012 | Deriche |
| 2014/0046465 A1 | 2/2014 | De Oliveira Antunes |

FOREIGN PATENT DOCUMENTS

| | | |
|---|---|---|
| EP | 2442958 B1 | 1/2014 |
| EP | 2385893 B1 | 5/2016 |
| WO | 20100146124 A1 | 12/2010 |

OTHER PUBLICATIONS

Hrsflow News: "The new FLEXflow", Jul. 1, 2013, retrieved from the internet: http://www.hrsflow.com/eng/news/news/the-new-flexflow.php [retrieved Jul. 29, 2015].

Notice of Intention to Grant in corresponding EP application No. 18 716 441.3 dated Dec. 5, 2019.

International Preliminary Report on Patentability in corresponding PCT application PCT/US2018/023229 dated Jul. 2, 2019.

C. Barks, "Multispeed Valve-Pin Control", MoldMaking Technology, pp. 24-27 (Oct. 2016).

Written Opinion in corresponding PCT application, PCT/US2018/023229, dated Mar. 29, 2019.

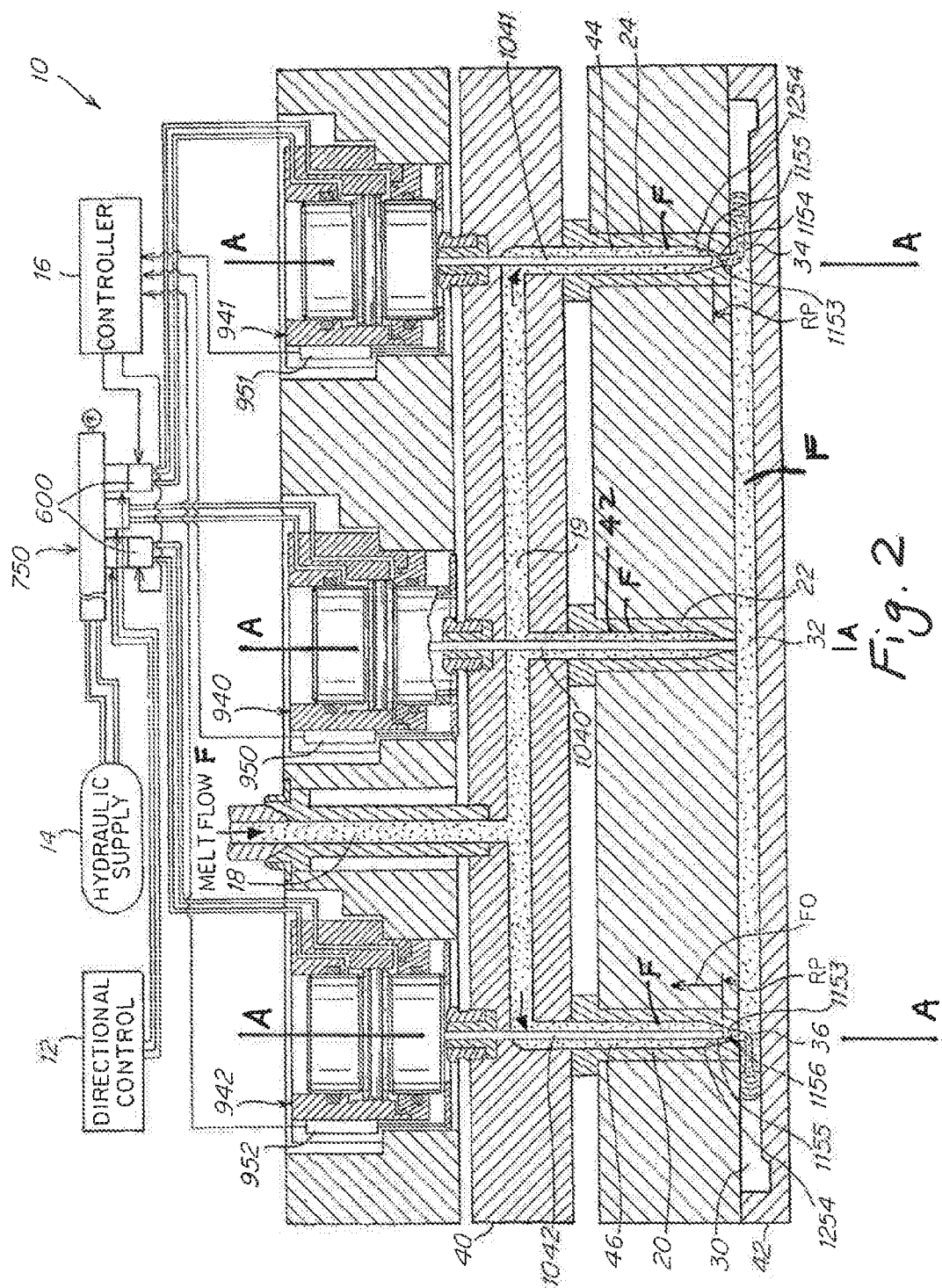

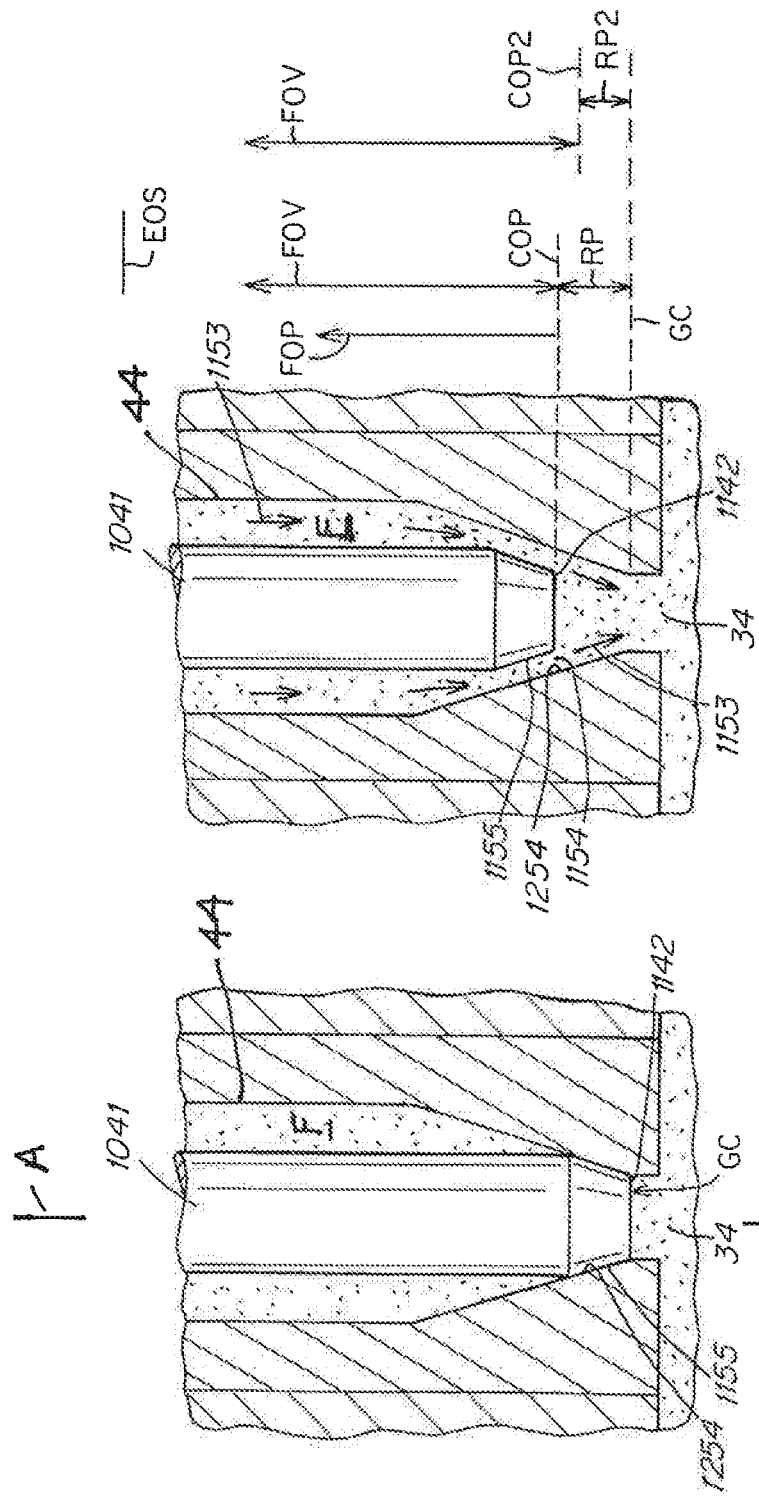

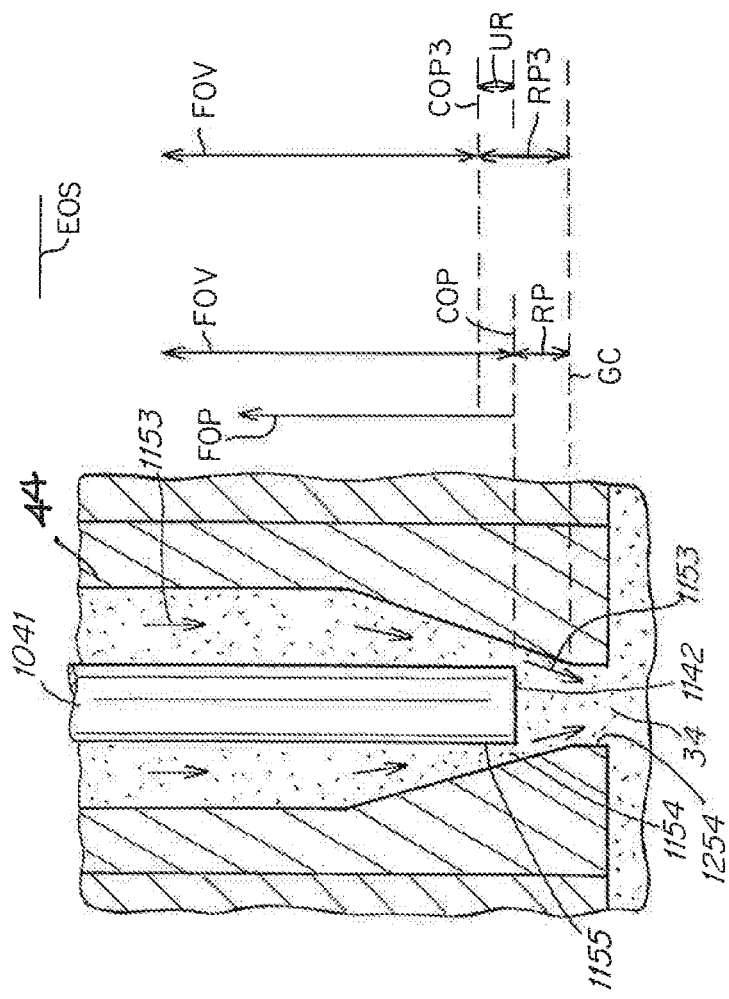
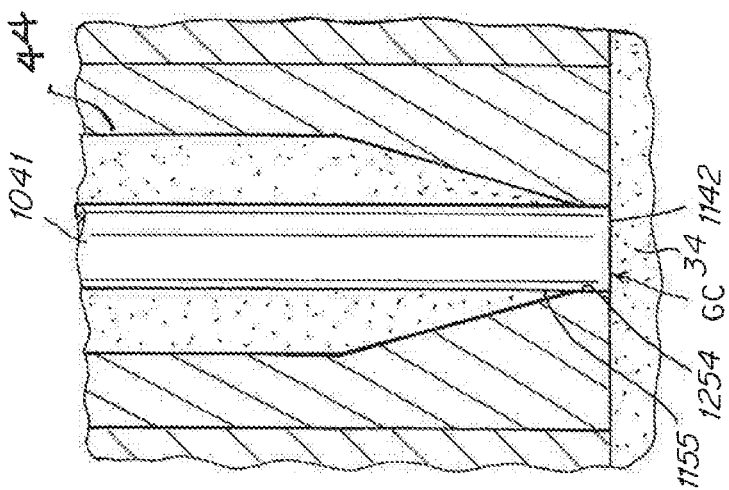
Fig. 4B
Fig. 4A

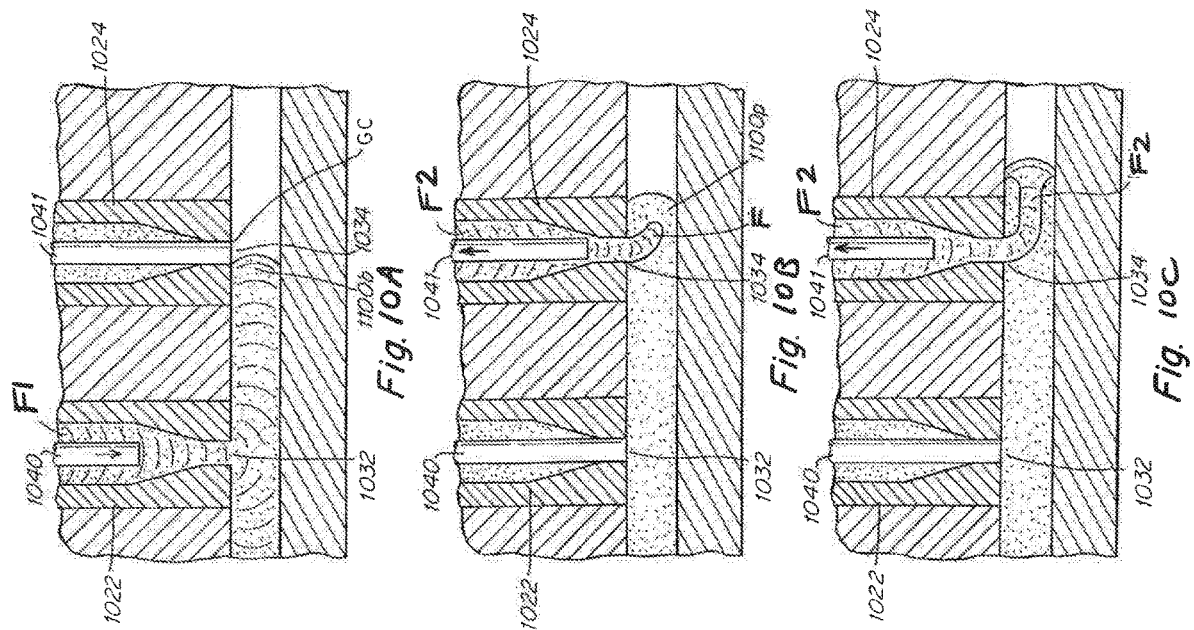

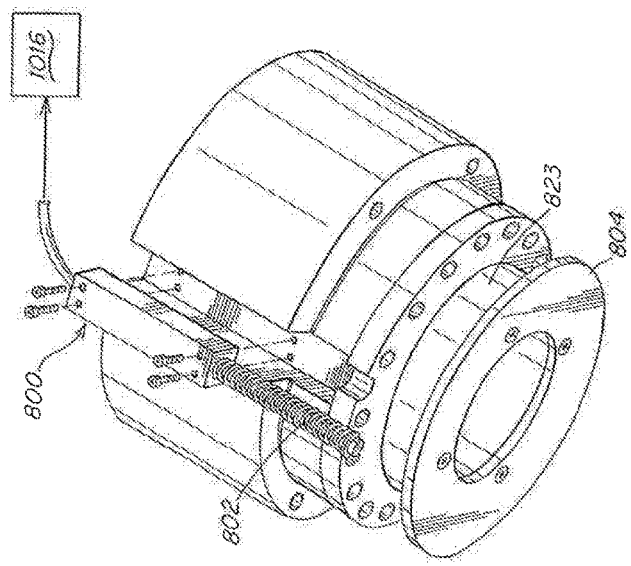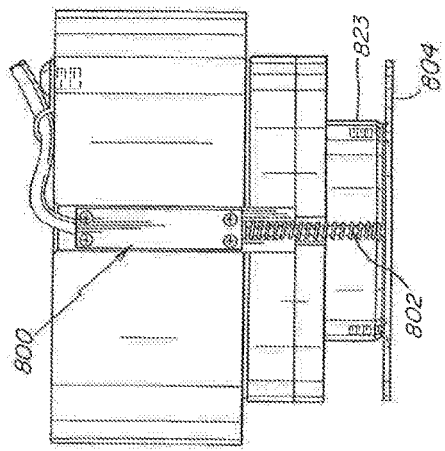

ural publication no. WO2016153704 (7149WO4), U.S. Pat. No. 9,205,587 (7117US0), U.S. application Ser. No. 15/432,175 (7117US2) filed Feb. 14, 2017, U.S. Pat. No. 9,144,929 (7118US0), U.S. Publication No. 20170341283 (7118US3), International Application PCT/US17/043029 (7165WO0) filed Jul. 20, 2017, International Application PCT/US17/043100 (7165WO1), filed Jul. 20, 2017 and International Application PCT/US17/036542 (7163WO0) filed Jun. 8, 2017, International Application PCT/US18/017422 filed Feb. 8, 2018 (7172WO0).

VALVE PIN POSITION AND VELOCITY CONTROL METHOD AND APPARATUS

RELATED APPLICATIONS

This application is a Continuation of PCT/US2018/23229 filed Mar. 20, 2018, which claims the benefit of priority to U.S. provisional 62/473,681 filed Mar. 20, 2017, the disclosures of which are hereby incorporated by reference with their entirety.

The disclosures of all of the following are incorporated by reference in their entirety as if fully set forth herein: U.S. Pat. Nos. 5,894,025, 6,062,840, 6,294,122, 6,309,208, 6,287,107, 6,343,921, 6,343,922, 6,254,377, 6,261,075, 6,361,300 (7006), U.S. Pat. Nos. 6,419,870, 6,464,909 (7031), U.S. Pat. Nos. 6,599,116, 7,234,929 (7075US1), U.S. Pat. No. 7,419,625 (7075US2), U.S. Pat. No. 7,569,169 (7075US3), U.S. patent application Ser. No. 10/214,118, filed Aug. 8, 2002 (7006), U.S. Pat. No. 7,029,268 (7077US1), U.S. Pat. No. 7,270,537 (7077US2), U.S. Pat. No. 7,597,828 (7077US3), U.S. patent application Ser. No. 09/699,856 filed Oct. 30, 2000 (7056), U.S. patent application Ser. No. 10/269,927 filed Oct. 11, 2002 (7031), U.S. application Ser. No. 09/503,832 filed Feb. 15, 2000 (7053), U.S. application Ser. No. 09/656,846 filed Sep. 7, 2000 (7060), U.S. application Ser. No. 10/006,504 filed Dec. 3, 2001, (7068), U.S. application Ser. No. 10/101,278 filed Mar. 19, 2002 (7070), U.S. Pat. No. 9,011,736 (7100US1) and PCT Application No. PCT/US11/062099 (7100WO0) and PCT Application No. PCT/US11/062096 (7100WO1), U.S. Pat. Nos. 8,562,336, 8,091,202 (7097US1) and U.S. Pat. No. 8,282,388 (7097US2), U.S. Pat. No. 9,724,861 (7129US4), U.S. Pat. No. 9,662,820 (7129US3), Publication No. WO2015006261 (7135WO0), U.S. Pat. No. 9,498,909 (7134US1) and Publication No. WO2014209857 (7134WO0), Publication No. WO2016153632 (7149WO2), International publication no. WO2016153704 (7149WO4), U.S. Pat. No. 9,205,587 (7117US0), U.S. application Ser. No. 15/432,175 (7117US2) filed Feb. 14, 2017, U.S. Pat. No. 9,144,929 (7118US0), U.S. Publication No. 20170341283 (7118US3), International Application PCT/US17/043029 (7165WO0) filed Jul. 20, 2017, International Application PCT/US17/043100 (7165WO1), filed Jul. 20, 2017 and International Application PCT/US17/036542 (7163WO0) filed Jun. 8, 2017, International Application PCT/US18/017422 filed Feb. 8, 2018 (7172WO0).

BACKGROUND

Injection molding systems have been developed having flow control mechanisms (e.g., a controller) that control the movement and/or rate of movement of a valve pin over the course of an injection cycle to cause the pin to move to one or select positions and/or to control the rate of movement of the pin over the course of the injection cycle. In one embodiment, the pin movement is controlled in order to raise or lower the rate of flow of fluid material to correspond to a predetermined profile of fluid flow rates for the injection cycle. A sensor is typically provided that senses a condition of the fluid material or of the apparatus (such as pin position) and sends a signal indicative of the sensed condition to a program contained in a controller that uses the signal as a variable input to control movement of the valve pin in accordance with the predetermined profile.

SUMMARY OF INVENTION

According to one embodiment of the invention, a method is provided for performing an injection molding cycle in an injection molding apparatus (10) comprising a manifold (40) that receives an injection fluid (F), the manifold distributing the injection fluid to a fluid delivery channel (44) that delivers the injection fluid under an injection pressure to a gate (34) of a mold cavity (30), and a valve pin (1041) having an axis (A) and a tip end (1142), the valve pin being slidably mounted for movement along the axis (A) within the fluid delivery channel (44), the valve pin being drivably interconnected to an actuator (941) in an arrangement wherein the actuator is adapted to drive the valve pin (1041) upstream and downstream along the axis (A) and drive the tip end (1142) of the valve pin upstream and downstream between a first closed position (GC) where the tip end of the valve pin obstructs the gate (34) to prevent the injection fluid from flowing into the cavity (30), a full open position (FOP) where the injection fluid material flows freely without restriction from the tip end of the pin through the gate, and one or more intermediate positions (RP, RP3) between the first closed position and the full open position wherein the tip end of the valve pin restricts flow of the injection fluid along at least a portion of the length of the drive path extending between the first closed position and the intermediate position, the method comprising steps of:
a) first controllably operating the actuator to drive the valve pin upstream beginning from the first closed position (50) to be moved to and held in a first selected position (51) for a first selected period of time during the course of an injection cycle, the first selected position (51) being the full open position;
b) second controllably operating the actuator to drive the valve pin, during the injection cycle, downstream beginning from the first selected position (51) to be moved to and held in a second closed position (52) for a second selected period of time;
c) third controllably operating the actuator to drive the valve pin, during the injection cycle, upstream beginning from the second closed position (52) to be moved to and held in a second selected position (53) for a third selected period of time, the second selected position being an intermediate position or the full open position; and
d) fourth controllably operating the actuator to drive the valve pin, during the injection cycle, downstream beginning from the second selected position (53) to be moved to a third closed position (54).

In one embodiment, step a) comprises driving the valve pin upstream from the first closed position (50) to the first selected position (51) at a maximum rate of travel at which the actuator is capable of driving the valve pin.

In one embodiment, step a) comprises driving the valve pin upstream from the first closed position (50) to the first selected position (51) at a reduced rate which is less than a maximum rate of travel at which the actuator is capable of driving the valve pin for a least a portion of the upstream travel from the first closed position (50) to the first selected position (51).

In one embodiment, step b) comprises driving the valve pin downstream from the first selected position (51) to the second closed position (52) at a maximum rate of travel at which the actuator is capable of driving the valve pin.

In one embodiment, step c) comprises driving the valve pin upstream from the second closed position (52) to the second selected position (53) at a reduced rate which is less than the maximum rate of travel at which the actuator is capable of driving the valve pin for a least a portion of the upstream travel from the second closed position (52) to the second selected position (53).

In one embodiment, the second selected position (53) is an intermediate position.

In one embodiment, the second selected position (53) is the full open position.

In one embodiment, step d) comprises driving the valve pin downstream from the second selected position (53) to the third closed position (54) at a maximum rate of travel at which the actuator is capable of driving the valve pin.

In one embodiment, the second selected position (53) in which the valve pin is held is a position at which pressure of the injection fluid is a pack pressure.

In another embodiment, an injection molding apparatus (10) is provided comprising a manifold (40) that receives an injection fluid (F) from an injection molding machine, the manifold distributing the injection fluid to a fluid delivery channel (44) that delivers the injection fluid under an injection pressure to a gate (32) of a mold cavity (30), and a valve pin (1041) having an axis (A) and a tip end (1142), the valve pin being slidably mounted for movement along the axis (A) within the fluid delivery channel (44),
wherein the valve pin (1041) is interconnected to an actuator (941) in an arrangement wherein the actuator is adapted to drive the valve pin (1041) upstream and downstream along the axis and to drive the tip end (1142) of the valve pin upstream and downstream between a first closed position (GC) where the tip end of the valve pin obstructs the gate to prevent the injection fluid from flowing into the cavity, a full open position (FOP) where the injection fluid material flows freely without restriction from the tip end of the pin through the gate, and one or more intermediate positions (RP, RP2) between the first closed position and the full open position wherein the tip end of the valve pin restricts flow of the injection fluid along at least a portion of the length of the drive path extending between the first closed position and the intermediate position,
the apparatus including a controller (16) with instructions to first controllably operate the actuator to drive the valve pin upstream beginning from the first closed position (50) to be moved to and held in a first selected position (51) for a first selected period of time during the course of an injection cycle, the first selected position (51) being the full open position,
the controller including instructions to second controllably operate the actuator to drive the valve pin, during the injection cycle, downstream beginning from the first selected position (51) to be moved to and held in a second closed position (52) for a second selected period of time;
the controller including instructions to third controllably operate the actuator to drive the valve pin, during the injection cycle, upstream beginning from the second closed position (52) to be held in a second selected position (53) for a third selected period of time, the second selected position (53) being an intermediate position or the full open position;
the controller including instructions to fourth controllably operate the actuator to drive the valve pin, during the injection cycle, downstream beginning from the second selected position (53) to a third closed position (54).

In one embodiment, the instructions to first controllably operate comprise instructions to drive the valve pin upstream from the first closed position (50) to the first selected position (51) at a maximum rate of travel at which the actuator is capable of driving the valve pin.

In one embodiment, the instructions to first controllably operate comprise instructions to drive the valve pin upstream from the first closed position (50) to the first selected position (51) at a reduced rate which is less than a maximum rate of travel at which the actuator is capable of driving the valve pin for a least a portion of the upstream travel from the first closed position (50) to the first selected position (51).

In one embodiment, the instructions to second controllably operate comprise instructions to drive the valve pin downstream from the first selected position (51) to the second closed position (52) at a maximum rate of travel at which the actuator is capable of driving the valve pin.

In one embodiment, the instructions to third controllably operate comprise instructions to drive the valve pin upstream from the second closed position (52) to the second selected position (53) at a reduced rate which is less than the maximum rate of travel at which the actuator is capable of driving the valve pin for a least a portion of the upstream travel from the second closed position (52) to the second selected position (53).

In one embodiment, the second selected position (53) is an intermediate position.

In one embodiment, the second selected position (53) is the full open position.

In one embodiment, the instructions to fourth controllably operate comprise instructions to drive the valve pin downstream from the second selected position (53) to the third closed position (54) at a maximum rate of travel at which the actuator is capable of driving the valve pin.

In one embodiment, the second selected position (53) in which the valve pin is held is a position at which pressure of the injection fluid is a pack pressure.

In one embodiment, the actuator comprises an electrically powered motor or electric motor or a hydraulic or pneumatic actuator.

In another embodiment, a method is provided for performing an injection molding cycle in an injection molding apparatus (10) comprising a manifold (40) that receives an injection fluid (F), the manifold distributing the injection fluid to a fluid delivery channel (44) that delivers the injection fluid under an injection pressure to a gate (34) of a mold cavity (30), and a valve pin (1041) having an axis (A) and a tip end (1142), the valve pin being slidably mounted for movement along the axis (A) within the fluid delivery channel (44),
the valve pin being drivably interconnected to an actuator (941) in an arrangement wherein the actuator is adapted to drive the valve pin (1041) upstream and downstream along the axis (A) and drive the tip end (1142) of the valve pin upstream and downstream between a first closed position (GC) where the tip end of the valve pin obstructs the gate (34) to prevent the injection fluid from flowing into the cavity (30), a full open position (FOP) where the injection fluid material flows freely without restriction from the tip end of the pin through the gate, and one or more intermediate positions (RP, RP3) between the first closed position and the full open position wherein the tip end of the valve pin restricts flow of the injection fluid along at least a portion of the length of the drive path extending between the first closed position and the intermediate position,
the method comprising steps of:
a) first controllably operating the actuator to drive the valve pin upstream beginning from the first closed position (50) to be moved to and held in a first selected position (51) for a first selected period of time during the course of an injection cycle, the first selected position (51) being an intermediate position;
b) second controllably operating the actuator to drive the valve pin, during the injection cycle, downstream beginning from the first selected position (51) to be moved to and held in a second closed position (52) for a second selected period of time;

c) third controllably operating the actuator to drive the valve pin, during the injection cycle, upstream beginning from the second closed position (52) to be moved to and held in a second selected position (53) for a third selected period of time, the second selected position being an intermediate position; and d) fourth controllably operating the actuator to drive the valve pin, during the injection cycle, downstream beginning from the second selected position (53) to be moved to a third closed position (54).

In one embodiment, step a) comprises driving the valve pin upstream from the first closed position (50) to the first selected position (51) at a maximum rate of travel at which the actuator is capable of driving the valve pin.

In one embodiment, step a) comprises driving the valve pin upstream from the first closed position (50) to the first selected position (51) at a reduced rate which is less than a maximum rate of travel at which the actuator is capable of driving the valve pin for a least a portion of the upstream travel from the first closed position (50) to the first selected position (51).

In one embodiment, step b) comprises driving the valve pin downstream from the first selected position (51) to the second closed position (52) at a maximum rate of travel at which the actuator is capable of driving the valve pin.

In one embodiment, step c) comprises driving the valve pin upstream from the second closed position (52) to the second selected position (53) at a reduced rate which is less than the maximum rate of travel at which the actuator is capable of driving the valve pin for a least a portion of the upstream travel from the second closed position (52) to the second selected position (53).

In one embodiment, step d) comprises driving the valve pin downstream from the second selected position (53) to the third closed position (54) at a maximum rate of travel at which the actuator is capable of driving the valve pin.

In one embodiment, the second selected position (53) in which the valve pin is held is a position at which pressure of the injection fluid is a pack pressure.

In another embodiment, an injection molding apparatus (10) is provided comprising a manifold (40) that receives an injection fluid (F) from an injection molding machine, the manifold distributing the injection fluid to a fluid delivery channel (44) that delivers the injection fluid under an injection pressure to a gate (32) of a mold cavity (30), and a valve pin (1041) having an axis (A) and a tip end (1142), the valve pin being slidably mounted for movement along the axis (A) within the fluid delivery channel (44), wherein the valve pin (1041) is interconnected to an actuator (941) in an arrangement wherein the actuator is adapted to drive the valve pin (1041) upstream and downstream along the axis and to drive the tip end (1142) of the valve pin upstream and downstream between a first closed position (GC) where the tip end of the valve pin obstructs the gate to prevent the injection fluid from flowing into the cavity, a full open position (FOP) where the injection fluid material flows freely without restriction from the tip end of the pin through the gate, and one or more intermediate positions (RP, RP2) between the first closed position and the full open position wherein the tip end of the valve pin restricts flow of the injection fluid along at least a portion of the length of the drive path extending between the first closed position and the intermediate position, the apparatus including a controller (16) with instructions to first controllably operate the actuator to drive the valve pin upstream beginning from the first closed position (50) to be moved to and held in a first selected position (51) for a first selected period of time during the course of an injection cycle, the first selected position (51) being an intermediate position, the controller including instructions to second controllably operate the actuator to drive the valve pin, during the injection cycle, downstream beginning from the first selected position (51) to be moved to and held in a second closed position (52) for a second selected period of time;

the controller including instructions to third controllably operate the actuator to drive the valve pin, during the injection cycle, upstream beginning from the second closed position (52) to be held in a second selected position (53) for a third selected period of time, the second selected position (53) being an intermediate position;

the controller including instructions to fourth controllably operate the actuator to drive the valve pin, during the injection cycle, downstream beginning from the second selected position (53) to a third closed position (54).

In one embodiment, the instructions to first controllably operate comprise instructions to drive the valve pin upstream from the first closed position (50) to the first selected position (51) at a maximum rate of travel at which the actuator is capable of driving the valve pin.

In one embodiment, the instructions to first controllably operate comprise instructions to drive the valve pin upstream from the first closed position (50) to the first selected position (51) at a reduced rate which is less than a maximum rate of travel at which the actuator is capable of driving the valve pin for a least a portion of the upstream travel from the first closed position (50) to the first selected position (51).

In one embodiment, the instructions to second controllably operate comprise instructions to drive the valve pin downstream from the first selected position (51) to the second closed position (52) at a maximum rate of travel at which the actuator is capable of driving the valve pin.

In one embodiment, the instructions to third controllably operate comprise instructions to drive the valve pin upstream from the second closed position (52) to the second selected position (53) at a reduced rate which is less than the maximum rate of travel at which the actuator is capable of driving the valve pin for a least a portion of the upstream travel from the second closed position (52) to the second selected position (53).

In one embodiment, the instructions to fourth controllably operate comprise instructions to drive the valve pin downstream from the second selected position (53) to the third closed position (54) at a maximum rate of travel at which the actuator is capable of driving the valve pin.

In one embodiment, the second selected position (53) in which the valve pin is held is a position at which pressure of the injection fluid is a pack pressure.

In one embodiment, the actuator comprises an electrically powered motor or electric motor or a hydraulic or pneumatic actuator.

BRIEF DESCRIPTION OF THE DRAWINGS

The above and further advantages of the invention may be better understood by referring to the following description in conjunction with the accompanying drawings in which:

FIG. 2 is a schematic cross-sectional side view of one embodiment of an injection molding apparatus that can be used to implement the invention, for sequentially delivering an injection fluid to a respective gate of a mold cavity while controlling the rate of travel of the valve pin and the positioning the tip end of the pin with respect to the gate;

FIGS. 3A-3B show, for one of the valve pins of FIG. 2, a tapered end of the valve pin positioned at various times and positions between a starting closed position as in FIG. 3A and various upstream opened positions, RP representing a selectable path length over which the velocity of withdrawal of the pin upstream from the gate closed position to an open position is reduced (e.g., via a controllable flow restrictor or electric actuator) relative to the velocity of upstream movement that the valve pin would normally have over the uncontrolled velocity path FOV when the hydraulic pressure is normally at full pressure and pin velocity is at its maximum;

FIGS. 4A-4B show, for another embodiment of a valve pin that having a cylindrically configured tip end, the tip end of the pin being positioned at various times and positions between a starting closed position as in FIG. 4A and various upstream opened positions, RP representing a path of selectable path length over which the velocity of withdrawal of the pin upstream from the gate closed position to an open position is reduced (via a controllable flow restrictor or electric actuator) relative to the velocity of upstream movement that the valve pin would normally have over the uncontrolled velocity path FOV when the hydraulic pressure of a hydraulic actuator is normally at full pressure and pin velocity is at its maximum;

FIGS. 10A-10E are schematic cross-sectional enlarged views of the center and one of the lateral gates of the FIG. 10 apparatus showing various stages of the progress of injection;

FIGS. 12A-12B show various embodiments of piston sensors that can be used in a variety of implementations of the invention, the sensors being mounted so as to measure the position of the piston component of the actuator which is indicative of the position of the valve pin relative to the gate;

DETAILED DESCRIPTION

Figure 1A:
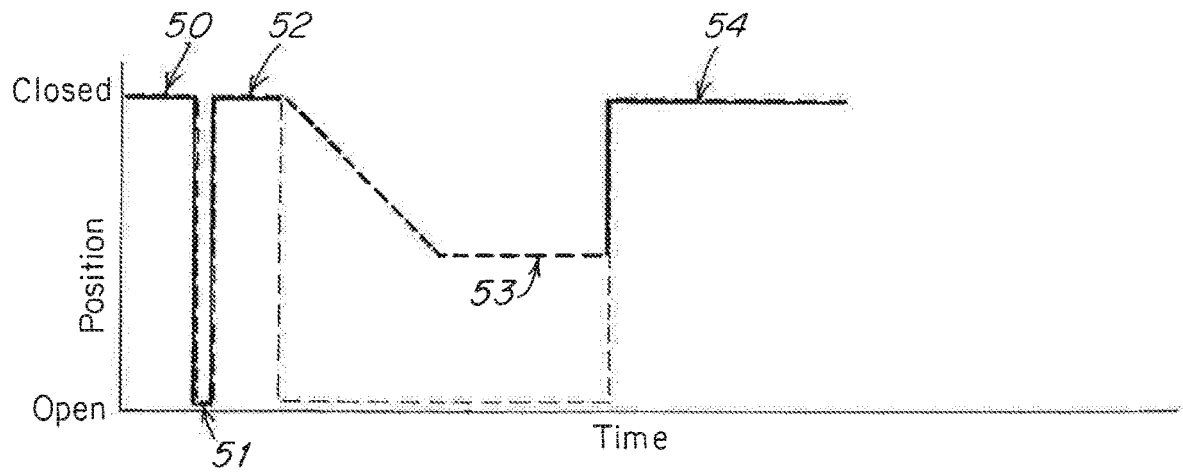
FIGS. 1A-1E are graphs of pin position versus time illustrating different pin profiles according to various embodiments of the invention.

Various embodiments will now be described with reference to the figures. In the following description, for purposes of explanation, numerous specific details are set forth in order to provide a thorough understanding of one or more implementations of the present invention. It will be evident, however, that the present invention may be practiced without these specific details. In other instances, well-known structures and devices are shown in block diagram form in order to facilitate describing the present invention.

As used in this application with regard to various monitoring and control systems, also referred to as a "controller", the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The present invention may also be illustrated as a flow chart of a process of the invention. While, for the purposes of simplicity of explanation, the one or more methodologies shown in the form of a flow chart are described as a series of acts, it is to be understood and appreciated that the present invention is not limited by the order of acts, as some acts may, in accordance with the present invention, occur in a different order and/or concurrent with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

In various embodiments of the invention disclosed herein, the term "data" is used. Data means any sequence of symbols (typically denoted "0" and "1") that can be input into a computer, stored and processed there, or transmitted to another computer. As used herein, data includes metadata, a description of other data. Data written to storage may be data elements of the same size, or data elements of variable sizes. Some examples of data include information, program code, program state, program data, other data, and the like.

As used herein, computer storage media includes both volatile and non-volatile, removable and non-removable media for storage of information such as computer-readable instructions, data structures, program modules, or other data. Computer storage media includes RAM, ROM, EEPROM, FLASH memory or other memory technology, CD-ROM, digital versatile disc (DVDs) or other optical disk storage, magnetic cassettes, magnetic tape, magnetic disk storage or other magnetic storage devices, or any other medium which can be used to store desired information and which can be accessed by the computer.

The methods described below may be implemented in a suitable computing and storage environment, e.g., in the context of computer-executable instructions that may run on one or more processors, microcontrollers or other computers. In a distributed computing environment (for example) certain tasks are performed by remote processing devices that are linked through a communications network and program modules may be located in both local and remote memory storage devices. The communications network may include a global area network, e.g., the Internet, a local area network, a wide area network or other computer network. It will be appreciated that the network connections described herein are exemplary and other means of establishing communications between the computers may be used.

A computer may include one or more processors and memory, e.g., a processing unit, a system memory, and system bus, wherein the system bus couples the system components including, but not limited to, the system memory and the processing unit (see for example FIG. 15) A computer may further include disk drives and interfaces to external components. A variety of computer-readable media can be accessed by the computer and includes both volatile and nonvolatile media, removable and nonremovable media. A computer may include various user interface devices including a display screen, touch screen, keyboard or mouse.

A. Valve Pin Profiles According to Various Embodiments of the Invention (FIGS. 1A-1E)

FIGS. 1A-1E are plots (graphs) of positioning and velocity of a valve pin during the course of an injection cycle, the plots illustrating controlled movement of a valve pin at reduced velocity relative to a high or maximum capable velocity, and holding of a pin at one upstream position intermediate fully closed and fully open where the flow of injection fluid is less than or restricted relative to a maximum flow of injection fluid for one or more selected period of times.

FIG. 1A is one example of a "double open, double close" in a single cycle in which the valve pin is first moved upstream (opened) to a fully open position and held, then fully closed, followed by a second upstream movement (opened a second time from the fully closed position) with controlled movement of the valve pin over a defined portion of initial second opening, and then held at an intermediate position, before fully closing the pin (a second time in the one cycle). This type of cycle can be used, in one embodiment, to first open the pin to pre-fill a channel leading to a mold cavity (e.g., to eliminate air of or pressure variations in the channel leading to the mold cavity, for example in a cold runner used in a sequential molding process), then fully close (a first time), and then reopen (a second time) to fill the mold cavity itself (as opposed to the pre-fill which is intended to the channel). FIG. 1A thus illustrates a process with steps of:

a) starting from fully closed (50), b) open the pin at a high or maximum velocity, optionally to full open and further optionally held at full open with no restriction in the flow path between the valve pin tip and the gate (51), c) close the pin at a high or maximum velocity to fully closed, and optionally hold at fully closed for a select period of time (52), d) open the pin (a second time) at a reduced or less than maximum velocity, to an intermediate position and then hold at the intermediate position for a select period of time (53), e) close the pin fully (a second time) at a high or maximum velocity to complete the cycle (54).

Figure 1B:
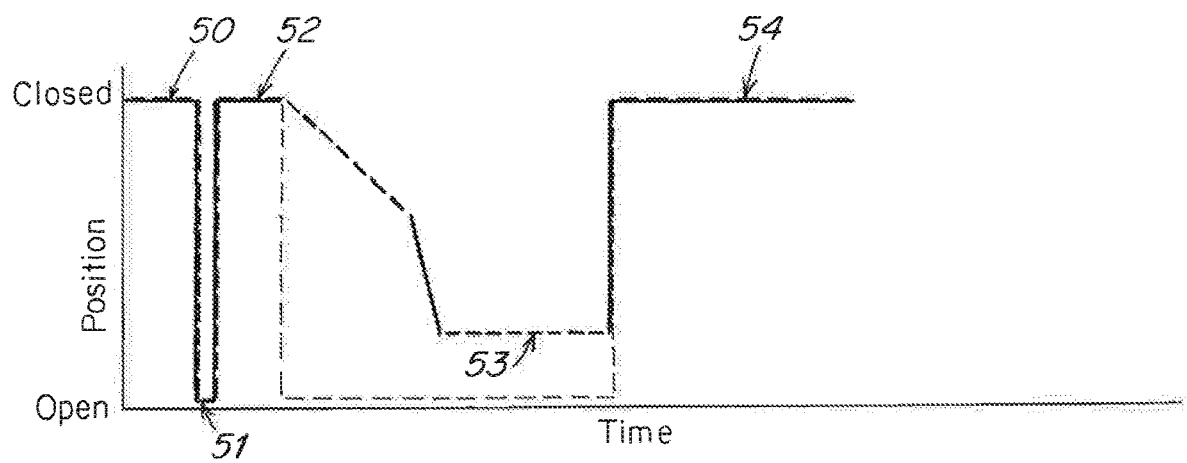

FIG. 1B is the same as FIG. 1A, but in step d) the pin is first moved upstream (opened) at a reduced velocity for a select period of time to travel to and through a first intermediate position (a change-over position, without being held at the first intermediate position), followed by a second upstream movement at a higher velocity (e.g., maximum velocity) to a second intermediate position and then held at the second intermediate position for a select period of time (53).

Figure 1C:
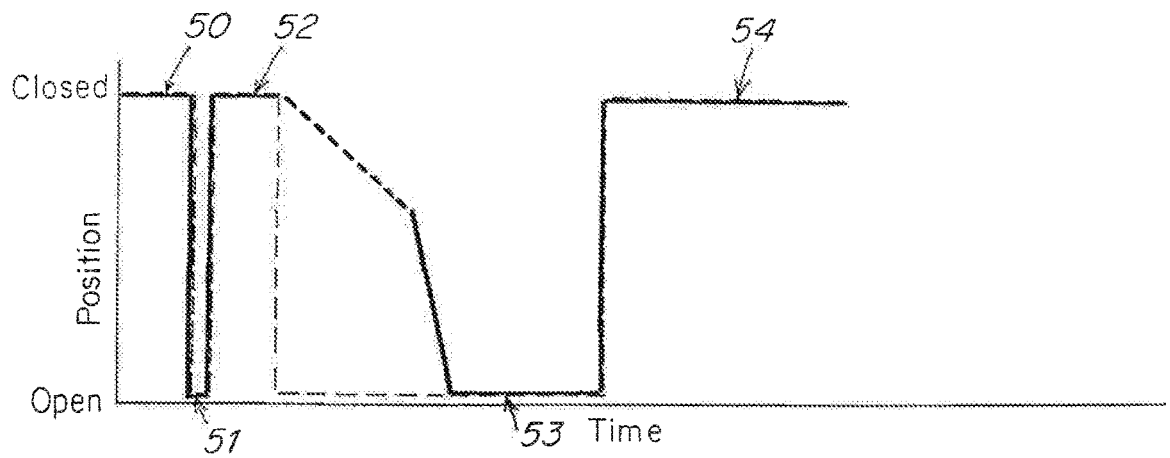

FIG. 1C is the same as FIG. 1B, but in step d) the second upstream movement is at maximum velocity to a fully open position and then held at the fully open position for a select period of time (53).

Figure 1D:
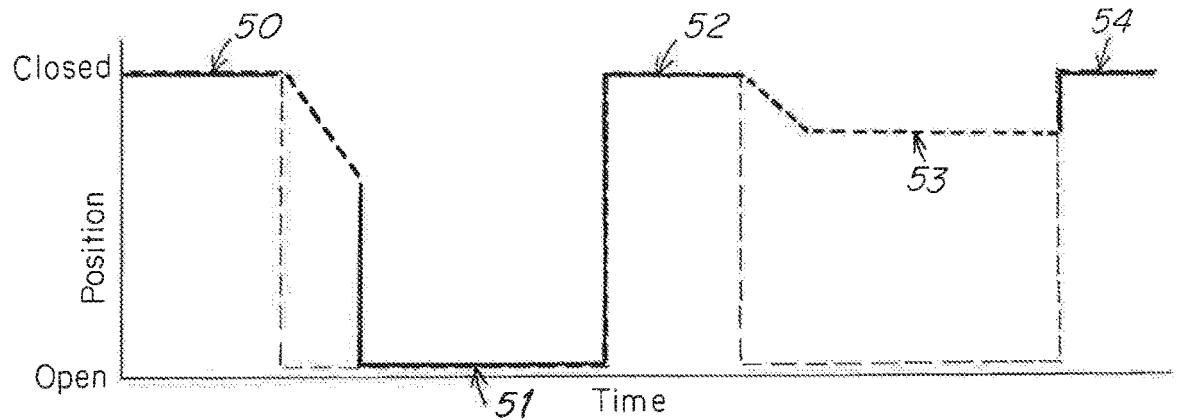

FIG. 1D is another example of a "double open, double close" in a single injection cycle in which the valve pin is first moved upstream (opened) to a fully open position and held, then fully closed, followed by a second upstream movement (opened a second time from the fully closed position) with controlled movement of the valve pin over a defined portion of initial second opening, and then held at an intermediate position, before fully closing the pin (a second time in the one cycle). This type of cycle can be used, in one embodiment, for controlled fill during the first opening, and/or controlled packing on the second opening. FIG. 1D thus illustrates a process with steps of:

a) starting from fully closed (50), b) open the pin at a reduced or less than maximum velocity, optionally to fully open and further optionally held at fully open with no restriction in the flow path between the valve pin tip and the gate, and hold at fully open for a select period of time (51), c) close the pin at a high or maximum velocity to fully closed, and optionally hold at fully closed for a select period of time (52), d) open the pin (a second time) at a reduced or less than maximum velocity, to an intermediate position and then hold at the intermediate position for a select period of time (53), e) close the pin fully (a second time) at a high or maximum velocity to complete the cycle (54).

Figure 1E:
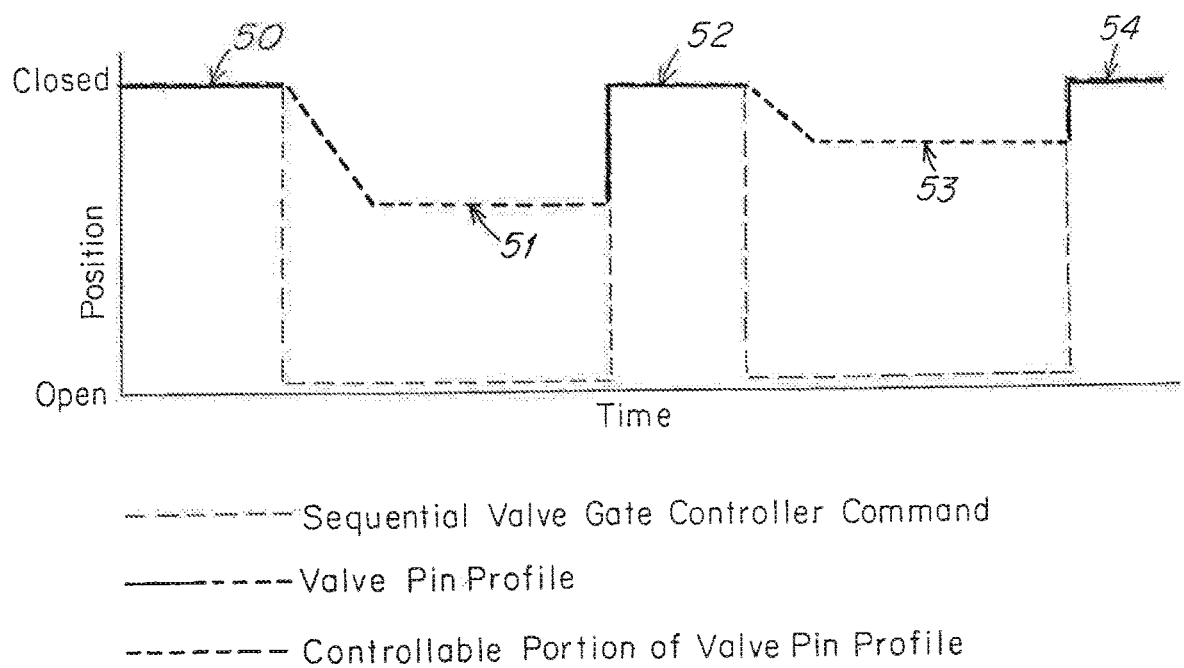

FIG. 1E is the same as FIG. 1D, but in step b) the pin is first moved upstream (opened) at a reduced velocity for a select period of time to a first intermediate position, and then held at the first intermediate position for a select period of time (53).

Variations on these and other embodiments of the invention are described below.

B. Injection Molding Apparatus with a Controller for Varying the Rate of Pin Travel and Providing a Restricted Flow Path Between the Distal End of the Valve Pin and the Gate (FIGS. 2-4)

FIG. 2 shows one embodiment of an injection molding apparatus 10 having a central nozzle 22 feeding molten material (melt flow F) from an injection molding machine through a main inlet 18 to a distribution channel 19 of a manifold 40. The distribution channel 19 commonly feeds three separate nozzles 20, 22, 24 which all commonly feed into a common cavity 30 of a mold 42. The central nozzle 22 is controlled by actuator 940 and arranged so as to feed into cavity 30 at an entrance point or gate 32 that is disposed at about the center of the cavity. A pair of laterally disposed nozzles 20, 24 (with respect to the central nozzle 22), are controlled by respective actuators 942, 941, feed into the cavity 30 at gates 34, 36 located distal 34 to the center gate 32. A controller 16 implements overall control of the injection process, sending signals to control movement of the actuators 940, 941, 942 via a hydraulic system in which a directional control valve 750 switches hydraulic fluid (from hydraulic supply 14) to the actuator cylinders in either of two directions: fluid out to withdraw the pin upstream, and fluid in to drive the pin downstream. The rate of travel (velocity) of the valve pins is determined by the regulation of the flow of hydraulic drive fluid that is pumped form the supply 14 to the actuators through a flow restrictor valve 600. Position sensors, described further below, monitor the movement of each actuator piston, and thus the position of the associated valve pin tip, with respect to the respective gate, enabling the control system to drive the valve pins and feed the cavity according to a predetermined pin profile (as discussed further below).

Figure 10:
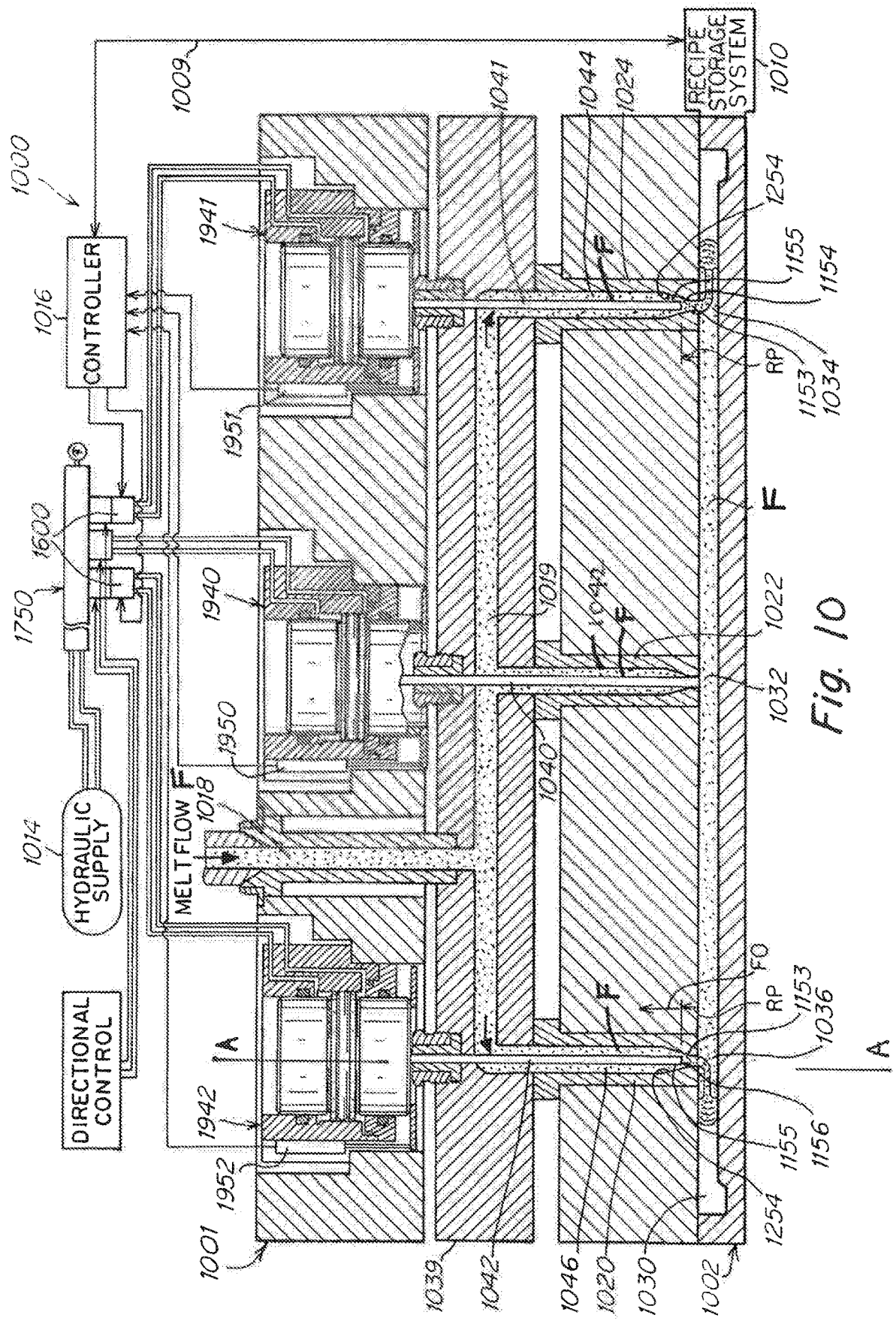
FIG. 10 is a schematic of an injection molding apparatus for implementing another embodiment of the invention, wherein a recipe (of process parameters) stored on a recipe storage system mounted in a mold is transmitted to and executed by a controller, the molding apparatus including a pair of sequential gates with a first gate disposed at a center position of a mold cavity having been opened and now closed such that a first shot of fluid material has entered the cavity and traveled past the positions of a pair of second sequential lateral gates (one at each end of the mold cavity), each second gate being open with its valve pin having traveled along an upstream restricted flow path RP allowing a second sequential shot of fluid material to flow into and merge with the first shot of material within the cavity.
Figure 10D:
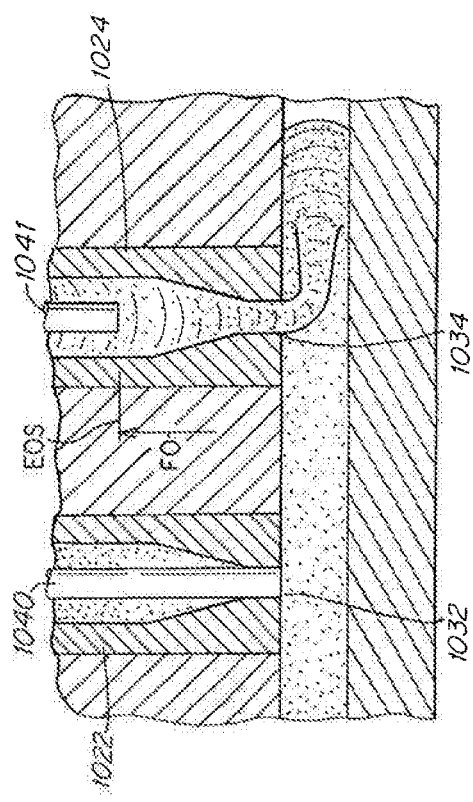
Figure 10E:
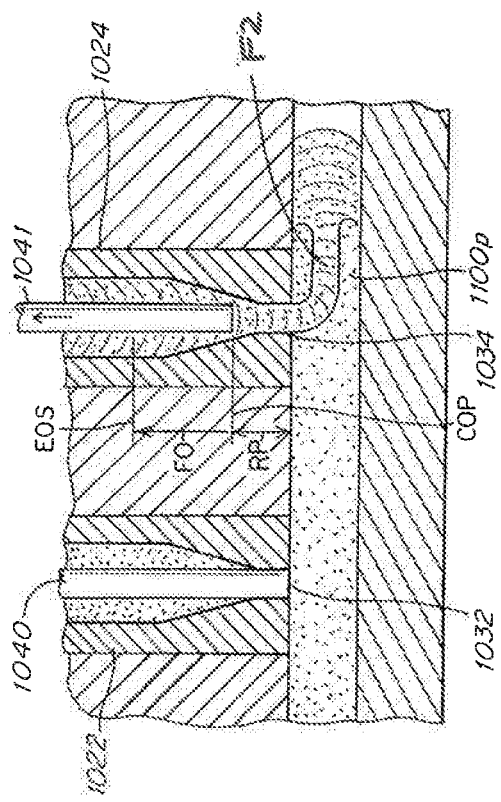

Here the injection cycle is a cascade process where injection is effected in a sequence from the center nozzle 22 first and at a later predetermined time from the lateral nozzles 20, 24. As shown in FIG. 10 the injection cycle is started by first opening (upstream withdrawal) of the valve pin 1040 of the center nozzle 22 from the center gate 32 allowing the fluid material F (typically molten polymer or plastic material) to flow into the cavity and then flow laterally in both directions toward each of the lateral gates 34, 36. The gate of the center injection nozzle 22 is typically left open only for so long as to allow the fluid material F to travel to a position just past the respective lateral gates 34, 36, at which time the center gate 32 of the center nozzle 22 is typically closed by pin 1040. The lateral gates 34, 36 are then opened by upstream withdrawal of lateral nozzle pins 1041, 1042. The rate of upstream withdrawal or travel velocity of the central 1040 and lateral pins 1041, 1042 can be controlled as described below.

In alternative embodiments, the center gate 32 and associated actuator 940 and valve pin 1040 can remain open at, during and subsequent to the times that the lateral gates 34, 36 are opened such that fluid material flows into cavity 30 through both the center gate 32 and one or both of the lateral gates 34, 36 simultaneously.

When the lateral gates 34, 36 are opened and fluid material F is allowed to first enter the mold cavity into the stream that has been injected from center nozzle 22 past gates 34, 36, the two streams mix with each other. If the velocity of the fluid material F entering from the lateral gates is too high, such as often occurs when the flow velocity of injection fluid material through gates 34, 36 is at maximum, a visible line or defect in the mixing of the two streams will appear in the final cooled molded product at the areas where gates 34, 36 inject into the mold cavity. By injecting F at a reduced flow rate for a period of time at the beginning when the gates 34, 36 are first opened and following the time when F first enters the existing flow stream in the cavity (coming from the center gate), the appearance of a visible line or defect in the final molded product can be reduced or eliminated.

The rate or velocity of upstream withdrawal of pins 1040, 1041, 1042 starting from the closed position is controlled via controller 16, which controls the rate and direction of flow of hydraulic fluid from a drive system 700 to the actuators 940, 941, 942. A "controller," as used herein, refers to electrical and electronic control apparati that comprise a single box or multiple boxes (typically interconnected and communicating with each other) that contain(s) all of the separate electronic processing, memory and electrical signal generating components that are necessary or desirable for carrying out and constructing the methods, functions and apparatuses described herein. Such electronic and electrical components include programs, microprocessors, computers, PID controllers, voltage regulators, current regulators, circuit boards, motors, batteries and instructions for controlling any variable element discussed herein such as length of time, degree of electrical signal output and the like. For example a component of a controller, as that term is used herein, includes programs, controllers and the like that perform functions such as monitoring, alerting and initiating an injection molding cycle including a control device that is used as a standalone device for performing conventional functions such as signaling and instructing an individual injection valve or a series of interdependent valves to start an injection, namely move an actuator and associated valve pin from a gate closed to a gate open position. In addition, although fluid driven actuators are employed in typical or preferred embodiments of the invention, actuators powered by an electric or electronic motor or drive source can alternatively be used as the actuator component.

Position sensors 950, 951, 952 sense the position of the actuator cylinders 940, 941, 942 and their associated valve pins (such as 1040, 1041, 1042) and feed such position information to controller 16 for monitoring purposes. The fluid material F is injected from an injection machine into an entry channel 18 of manifold 40, from which it is then flows through channel 19 and further downstream into the bores (delivery channels) 42, 44, 46 of the nozzles 22, 24, 26 and ultimately downstream through the gates 32, 34, 36. When the pins 1040, 1041, 1042 are withdrawn upstream to a position where the tip end of the pin is in a fully upstream open position (FOV in FIG. 3B), the rate of flow of fluid material through the respective gate 32, 34, 36 is at a maximum. However when at least the lateral pins 1041, 1042 are initially withdrawn beginning from the closed gate position (GC), to intermediate upstream positions (RP, RP2), a gap 1154, 1156 that restricts the velocity of fluid material flow is formed between the outer surfaces 1155 of the tip end of the pins 44, 46 and the inner surfaces 1254, 1256 of the gate areas of the nozzles 24, 20. The restricted flow gap 1154, 1156 remains small enough to restrict and reduce the rate of flow of fluid material 1153 through gates 34, 36 to a rate that is less than maximum flow velocity over a travel distance RP of the tip end of the pins 1041, 1042 going from closed to upstream as shown in FIGS. 3B and 4B.

The pins can be controllably withdrawn at one or more reduced velocities (less than maximum) for one or more periods of time over the entirety of the length of the path RP over which flow of mold material F is restricted. Preferably the pins are withdrawn at a reduced velocity over more than about 50% of RP and most preferably over more than about 75% of the length RP. As described below with reference to FIGS. 3B, 4B, the pins 1041 can be withdrawn at a higher or maximum velocity at the end COP2 of a less than complete restricted mold material flow path RP2.

The trace or visible lines that appear in the body of a part that is ultimately formed within the cavity of the mold on cooling above can be reduced or eliminated by reducing or controlling the velocity of the pin 1041, 1042 opening or upstream withdrawal from the gate closed position to a selected intermediate upstream gate open position that is preferably 75% or more of the length of RP.

RP can be about 1-8 mm in length and more typically about 2-6 mm and even more typically 2-4 mm in length. As shown in FIG. 2 in such an embodiment, a control system or controller 16 is preprogrammed to control the sequence and the rates of valve pin 1040, 1041, 1042 opening and closing. The controller 16 controls the rate of travel, namely velocity of upstream travel, of a valve pin from its gate closed position for at least the predetermined amount of time that is selected to withdraw the pin at the selected reduced velocity rate.

The velocity of withdrawal of the valve pins is determined by regulation of the flow of hydraulic drive fluid that is pumped from a supply 14 to the actuators through a flow restrictor valve 600. When the flow restrictor valve 600 is completely open, namely 100% open, allowing maximum flow of the pressurized hydraulic fluid to the actuator cylinders, the valve pins 1041, 1042 are driven at a maximum upstream travel velocity. The degree of openness of the flow restrictor valve is adjusted in response to sensing of position of a suitable component such as an actuator 941, 942 or associated valve pin to less than 100% open. Adjustment of the flow restrictor valve 600 to less than 100% open thus reduces the rate and volume flow of pressurized hydraulic fluid to the actuator cylinders thus in turn reducing the velocity of upstream travel of the pins 1041, 1042 for the selected period of time. At the end of the travel or length of path RP, RP2, a position sensor signals the controller 16, the controller 16 determines that the end COP, COP2 has been reached and the valve 600 is opened to a higher velocity, typically to its 100% open position to allow the actuator pistons and the valve pins 1041, 1042 to be driven at maximum upstream velocity FOV in order to reduce the cycle time of the injection cycle.

Typically the user selects one or more reduced velocities that are less than about 90% of the maximum velocity (namely velocity when the valve 600 is fully open), more typically less than about 75% of the maximum velocity and even more typically less than about 50% of the maximum velocity at which the pins 1041, 1042 are drivable by the hydraulic system. The actual maximum velocity at which the actuators 941, 942 and their associated pins 1041, 1042 are driven is predetermined by selection of the size and configuration of the actuators 941, 942, the size and configuration of the restriction valve 600 and the degree of pressurization and type of hydraulic drive fluid selected for use by the user. The maximum drive rate of the hydraulic system is predetermined by the manufacturer and the user of the system and is typically selected according to the application, size and nature of the mold and the injection molded part to be fabricated.

Preferably, the valve pin and the gate are configured or adapted to cooperate with each other to restrict and vary the rate of flow of fluid material F, in the direction of arrows 1153, over the course of travel of the tip end of the valve pin through the restricted velocity path RP. Most typically as shown in FIGS. 3A, 3B the radial tip end surface 1155 of the end 1142 of pin 1041, 1042 is conical or tapered and the surface of the gate 1254 with which pin surface 1155 is intended to mate to close the gate 34 is complementary in conical or taper configuration. Alternatively as shown in FIGS. 4A, 4B, the radial surface 1155 of the tip end 1142 of the pin 1041, 1042 can be cylindrical in configuration and the gate can have a complementary cylindrical surface 1254 with which the tip end surface 1155 mates to close the gate 34 when the pin 1041 is in the downstream gate closed position. In any embodiment, the outside radial surface 1155 of the tip end 1142 of the pin 1041 creates restricted a restricted flow channel 1154 over the length of travel of the tip end 1142 through and along restricted flow path RP that restricts or reduces the volume or rate of flow of fluid material 1153 (F) relative to the rate of flow when the pin 1041, 1042 is at a full gate open position, namely when the tip end 1142 of the pin 1041 has travelled to or beyond the length of the restricted flow path RP (which is, for example a 4 mm upstream travel position).

In one embodiment, as the tip end 1142 of the pin 1041 continues to travel upstream from the gate closed GC position (as shown for example in FIGS. 3A, 4A) through the length of the RP path (namely the path travelled for the predetermined amount of time), the rate of material fluid flow 1153 (F) through restriction gap 1154 through the gate 34 into the cavity 30 continues to increase from 0 at gate closed GC position to a maximum flow rate when the tip end 1142 of the pin reaches a position FOP (full open position), where the pin is no longer restricting flow of injection mold material through the gate. In such an embodiment, at the expiration of the predetermined amount of time when the pin tip 1142 reaches the FOP (full open) position, the pin 1041 is immediately driven by the hydraulic system at maximum velocity FOV (full open velocity) typically such that the restriction valve 600 is opened to full 100% open.

In alternative embodiments, when the predetermined time for driving the pin at reduced velocity has expired and the tip 1142 has reached the end of restricted flow path RP2, the tip 1142 may not necessarily be in a position where the fluid flow 1153 is not still being restricted. In such alternative embodiments, the fluid flow 1153 can still be restricted to less than maximum flow when the pin has reached the changeover position COP2 where the pin 1041 is driven at a higher, typically maximum, upstream velocity FOV. In the alternative examples shown in the FIGS. 3B, 4B examples, when the pin has travelled the predetermined path length at reduced velocity and the tip end 1142 has reached the changeover point COP, the tip end 1142 of the pin 1041 (and its radial surface 1155) no longer restricts the rate of flow of fluid material 1153 through the gap 1154 because the gap 1154 has increased to a size that no longer restricts fluid flow 1153 below the maximum flow rate of material 1153. Thus in one of the examples shown in FIG. 3B the maximum fluid flow rate for injection material 1153 is reached at the upstream position COP of the tip end 1142. In another example shown in FIG. 3B 4B, the pin 1041 can be driven at a reduced velocity over a shorter path RP2 that is less than the entire length of the restricted mold material flow path RP and switched over at the end COP2 of the shorter restricted path RP2 to a higher or maximum velocity FOV. In one example the upstream FOP position is about 4 mm and 5 mm respectively upstream from the gate closed position.

In another alternative embodiment, shown in FIG. 4B, the pin can be driven and instructed to be driven at reduced or less than maximum velocity over a longer path length RP3 having an upstream portion UR where the flow of injection fluid mold material is not restricted but flows at a maximum rate through the gate 34 for the given injection mold system. In this FIG. 4B example the velocity or drive rate of the pin 1041 is not changed over until the tip end of the pin 1041 or actuator 941 has reached the changeover position COP3. As in other embodiments, a position sensor senses either that the valve pin 1041 or an associated component has travelled the path length RP3 or reached the end COP3 of the selected path length and the controller receives and processes such information and instructs the drive system to drive the pin 1041 at a higher, typically maximum velocity upstream. In another alternative embodiment, the pin 1041 can be driven at reduced or less than maximum velocity throughout the entirety of the travel path of the pin during an injection cycle from the gate closed position GC up to the end-of-stroke EOS position, the controller 16 being programmed to instruct the drive system for the actuator to be driven at one or more reduced velocities for the time or path length of an entire closed GC to fully open EOS cycle.

At the expiration of the predetermined reduced velocity drive time, the pins 1041, 1042 are typically driven further upstream past the COP, COP2 position to a maximum end-of-stroke EOS position. The upstream COP, COP2 position is downstream of the maximum upstream end-of-stroke EOS open position of the tip end 1142 of the pin. The length of the path RP or RP2 is typically between about 2 and about 8 mm, more typically between about 2 and about 6 mm and most typically between about 2 and about 4 mm. In practice the maximum upstream (end of stroke) open position EOS of the pin 1041, 1042 ranges from about 8 mm to about 18 inches upstream from the closed gate position GC.

C. Flow Control Apparatus and Method (FIGS. 5-14)

Another embodiment of a flow control and sensing system 110 for implementing and generating pin profiles for use in various embodiments of the invention will now be described with respect to FIGS. 5-14.

In this embodiment, a microcontroller (MCU) controls some or all of the functions of an injection process. An MCU is a small self-contained computer chip, essentially comprising a small computer on a single integrated circuit and including a microprocessor, memory, and I/O on a single chip. The chip may be programmed for select functions, the program code being stored on Flash, EPROM or other non-violate memory. In the embodiment described below an MCU is used in each of a recipe storage system, a flow control system, and a user interface system. The MCU may be embedded in a printed circuit board (PCB), e.g., within the main PCB of the controller, a PCB within a storage device (in a junction box) and/or a PCB within an input device (such as a voice input interface).

Figure 5:
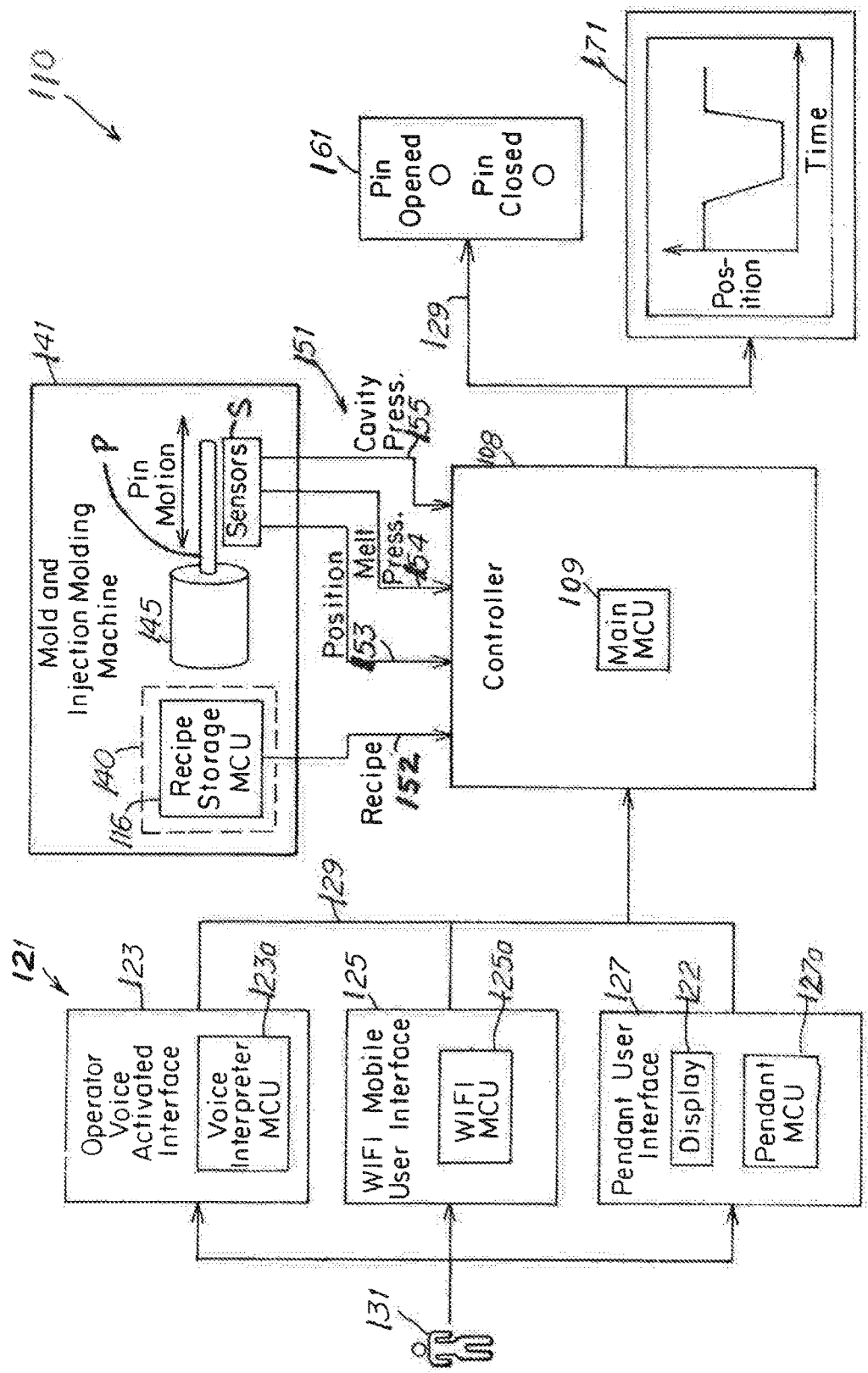
FIG. 5 is a schematic of a control system utilizing microcontrollers (MCUs) for monitoring and/or controlling an injection molding process for implementing another embodiment of the invention, the control system including a recipe MCU located at the mold and a flow control MCU preferably remote from (optionally local to) the mold, and various human operator interfaces remote from the mold for monitoring and/or providing input to the MCUs with regard to the injection molding process.

FIG. 5 is a schematic diagram of a flow control apparatus 110 and method in which a recipe storage MCU 116 and a flow control (main) MCU 109 replace the prior known controller, and communicate with an operator interface 121. It is to be understood that this flow control apparatus and method can be used with various injection molding machines and molding processes known to the skilled person.

The flow control microcontroller (MCU) 109, also referred to as the main MCU, functions as a central controller 8 and is operative to communicate (over wired or wireless media 129) with one or more types of user interfaces 121 including for example a voice activated interface 123, a mobile (Wi-Fi) interface 125, and a wired interface 127. A user (human operator) 131 can input to the interface 121 various process parameters, such as inputs to a recipe for controlling various types of actuators used in the molding process. The inputs will be transmitted from the user interface to the main flow control MCU. The flow control MCU in turn communicates (over wired or wireless media 151) with a remote recipe storage MCU 116 mounted on a mold 140 of an injection molding apparatus 141 (also referred as to an injection molding machine IMM). The flow control apparatus includes one or more valve pins P each driven by an actuator 145 for opening and closing one or more respective mold cavities. The actuator may be any type of known actuator, including electrical, hydraulic, or pneumatic actuators. The actuator drives a pin for opening and closing a gate (an opening into the mold cavity), and the movement of the pin P may be monitored by one or more sensors S or signals on/from the mold 140 or machine 141 for determining one or more process parameters such as pin position, pin velocity, or melt pressure in the cavity or in a fluid channel upstream of the cavity (e.g., manifold), or temperature in the cavity or in a fluid channel upstream of the cavity, or the mold cycle count. The recipe, for a respective mold, is stored in the recipe storage MCU 116 which is mounted on the mold 140, and the recipe is electronically transmitted from the recipe MCU 116 to the main MCU 109, remote from the mold, the latter of which implements computer instructions for controlling various parameters related to the molding process of the respective mold in accordance with the recipe.

In one example, the flow control (main) MCU 109 will automatically obtain or receive the recipe of process parameters (e.g., set-up information) from the remote recipe MCU 116 which is located on the mold. This allows for uninterrupted mold changes, namely the mold and its associated recipe will be read automatically by the flow control MCU 109, without requiring programming of the flow control MCU. The transmitted recipe data can be implemented by executing the flow control computer instructions stored on the flow control MCU 109. For example, the flow control MCU can be used to control the velocity of the pin(s), maintain the melt pressure at a desired melt pressure profile, and/or sequence the pin(s) in a mold using various other inputs.

Furthermore, the flow control (main) MCU 109 receives as input(s) from the mold 140 and/or machine 141 one or more electronic signals (digital or analog), over communication channels 151, indicative of the molding process, thus providing a feedback loop for one or more process parameters, e.g., for pressure control based on melt pressure and/or cavity pressure. This feedback can be provided or displayed to an operator 131, allowing the operator to input changes to the recipe, and the modified recipe can then be executed by the main MCU (as the new current recipe).

In one embodiment, the recipe storage MCU 116 is mounted on an electrical junction box (a container for electrical connections) which allows for communications between the mold 140 and the flow control MCU 109 in order to retrieve and store recipes on the mold MCU 116. In addition to communicating the recipe data, the flow control MCU can interact (e.g., via the junction box) with various optional sensors and signals on/from the mold and machine, such as position sensors, melt pressure sensors, cavity pressure sensors, temperature sensors, screw position and other injection molding machine signals to control the actuation of each pin in the mold, or the mold cycle count. FIG. 5 shows various signals 151, including recipe 152, position 153, melt pressure 154 and cavity pressure 155, being electronically transmitted from the mold machine to the remote main MCU 109, e.g., via wired or wireless communication channel(s).

As previously described, the user interface 121 enables a user 131 (human operator) to observe the tracking of the actual process parameters, versus the target (desired) process parameters, during the injection cycle in real time, or after the cycle is complete. In one example, the interface 121 includes an associated display 122 for tracking such parameters. One type of display is a simple indicator panel (similar to panel 161 shown in communication with the controller 108) that tells the operator whether the valve pin is open or closed. In this example, the control system can transmit discrete signals indicating whether the valve pin is closed or opened.

In another example, a display (such as display 171) is provided that enables continuous position monitoring of the pin, by the user. In this example, the control system 8 transmits a signal to drive a display showing (e.g., in a graph of position versus time) the position of the valve pin throughout the injection cycle.

The display(s) can be either local or remote with respect to the flow control MCU, the user interface, and/or the mold. In one example, the pin open/closed indicator panel 161 is mounted on the injection molding machine 141. In another example, the graphical display 171 (of pin position versus time) is provided on the user interface 121, such as on a display screen of a mobile telephone, smartphone, tablet or other computer device.

In one embodiment, the user interface 121 is a voice activated interface 123 and includes a voice interpreter MCU 123*a*. Such an interface may utilize any of various readily available components, such as a voice recognition chip. As the operator will typically have fairly specific and a limited range of inputs (commands), any of various commercially available voice recognition software can be used. For example, RSC-364 is a single chip that combines the flexibility of a microcontroller with advanced speech technology, including high-quality speech recognition, speech and music synthesis, speaker verification, and voice record and playback. A product can use one or all of the RSC-364 features in a single application. See http://www.sensoryinc.com/.

In another embodiment, the operator interface 121 is a mobile interface 125, such as a WiFi interface, that can be accessed via a local wireless hot spot. The wireless device can be any of various mobile laptops, tablets, smartphones, or other forms of computers that can run applications and/or a browser. In one example, a WiFi MCU 125*a* receives input via the mobile device from the human operator 131 and communicates parameters/commands to the flow control MCU 109. This would enable the operator to travel around an injection molding facility or plant, while inputting commands. Further, assuming the mobile device includes a display screen providing process feedback on the existing profile data, the operator can then generate and transmit changes to the recipe from the user interface to the mold MCU 116 (either directly or via the main MCU 109). The modified recipe can then be stored at the mold MCU 116 as the (new) current recipe.

In a further alternative, the user interface 121 is a hard-wired interface 127, such as a desktop computer or computer device with an input keyboard or graphical user interface. The one or more interfaces 123, 125, 127 can be connected to the main MCU 109 of controller 108 via wired or wireless communication channels 129.

C1. Flow Control Method (FIGS. 6-9)

Figure 6:
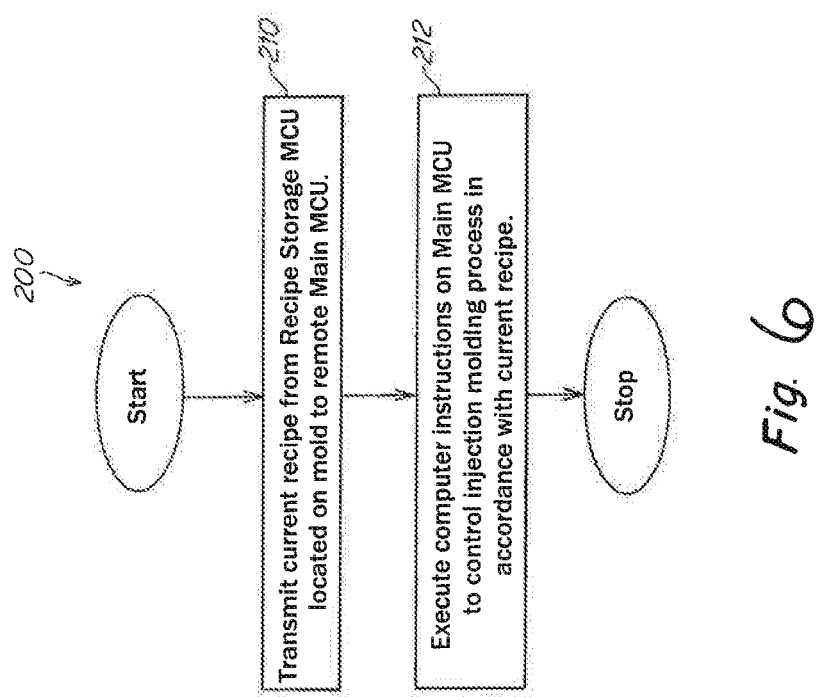
FIG. 6 is a flow chart illustrating one method of implementing the control system of FIG. 5.

FIG. 6 illustrates one method embodiment 200 illustrating use of the control system of FIG. 5 In step 210, the current recipe stored on a recipe storage MCU located on the mold, is transmitted to the remote main MCU. In the next step 212, the main MCU executes computer instructions to control the injection molding process in accordance with the current recipe.

Figure 7:
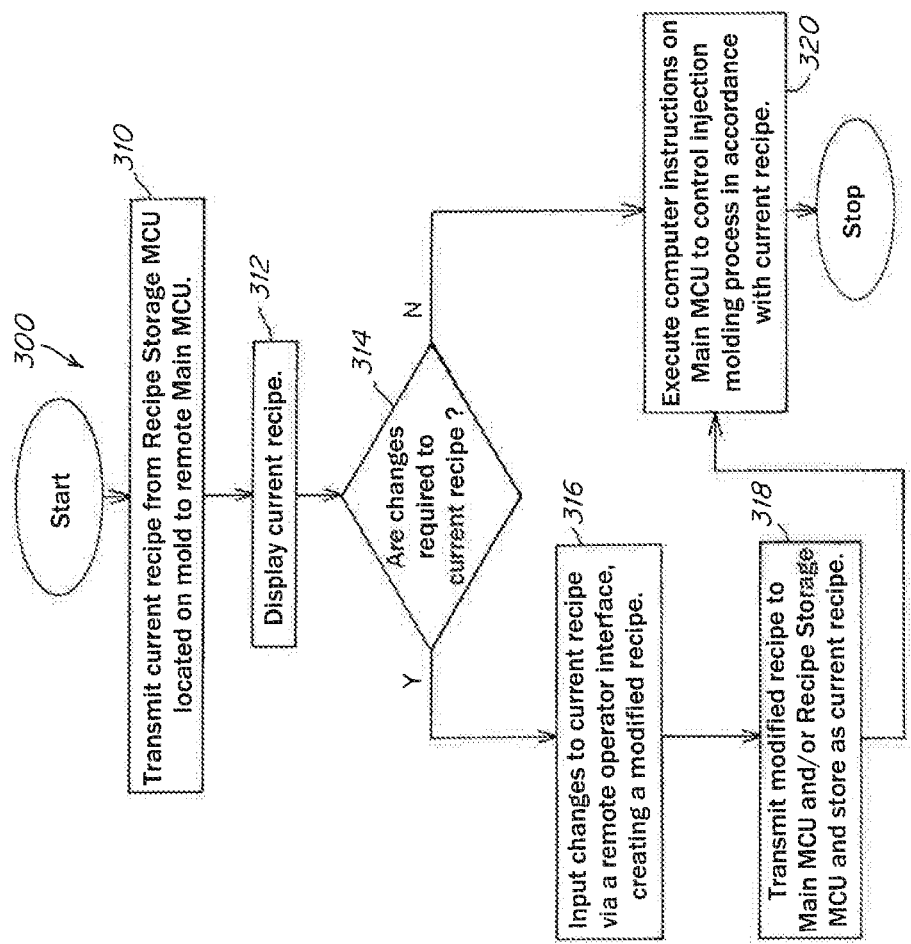
FIG. 7 is a flow chart illustrating one method of implementing the control system of FIG. 5.

Another method embodiment 300 is illustrated in FIG. 7. In a first step 310, the current recipe is transmitted from the recipe storage MCU located on the mold to the remote main MCU and stored as the (new) current recipe. In a next step 312, the current recipe is displayed. In step 314, a human operator (viewing the display) determines whether changes are required to the current recipe. If changes are required, then in step 316 the operator inputs changes to the current recipe via a remote human operator interface, creating a modified recipe. Next, at step 318, the modified recipe is transmitted to the main MCU and/or recipe storage MCU and stored as the (new) current recipe. Then the method proceeds to step 320, where the main MCU executes computer instructions to control the injection molding process in accordance with the current (modified) recipe. Alternatively, if no changes are required to the current recipe (at step 314), then the method proceeds immediately to step 320 to execute the computer instructions in accordance with the current (unmodified) recipe.

Figure 8:
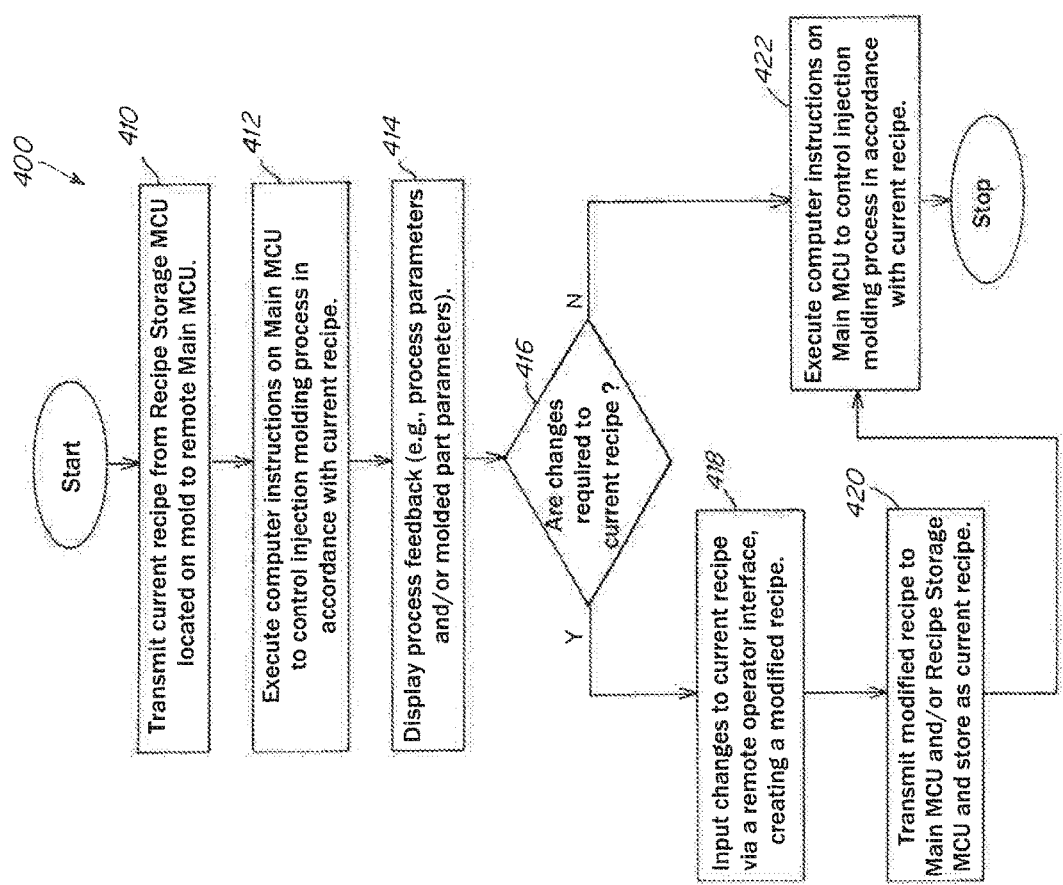
FIG. 8 is a flow chart illustrating one method of implementing the control system of FIG. 5.

FIG. 8 illustrates another method embodiment 400. In a first step 410, the current recipe is transmitted from the recipe storage MCU located on the mold to the remote main MCU. In the next step 412, the main MCU executes computer instructions to control the injection molding process in accordance with the recipe. In the next step 414, process feedback is displayed, for example process parameters and/or molded part parameters from which the human operator can determine whether to make changes to the recipe. In the next step 416, the human operator determines whether changes to the current recipe are required. If so, in the next step 418 the operator inputs changes to the current recipe via a remote operator interface creating a modified recipe. In the next step 420, the modified recipe is transmitted to the main MCU and/or the recipe storage MCU. In the next step 422, the main MCU executes computer instructions to control the injection molding process in accordance with the new current (modified) recipe. Alternatively, if no changes are required (at step 414), then the method proceeds directly to step 422 to execute the computer instructions in accordance with the current (unmodified) recipe. In an optional further feedback loop, during or after step 422 the process returns to step 414 to display process feedback, wherein the operator can then determine at step 416 whether to further modify the current (or previously modified) recipe.

Figure 9:
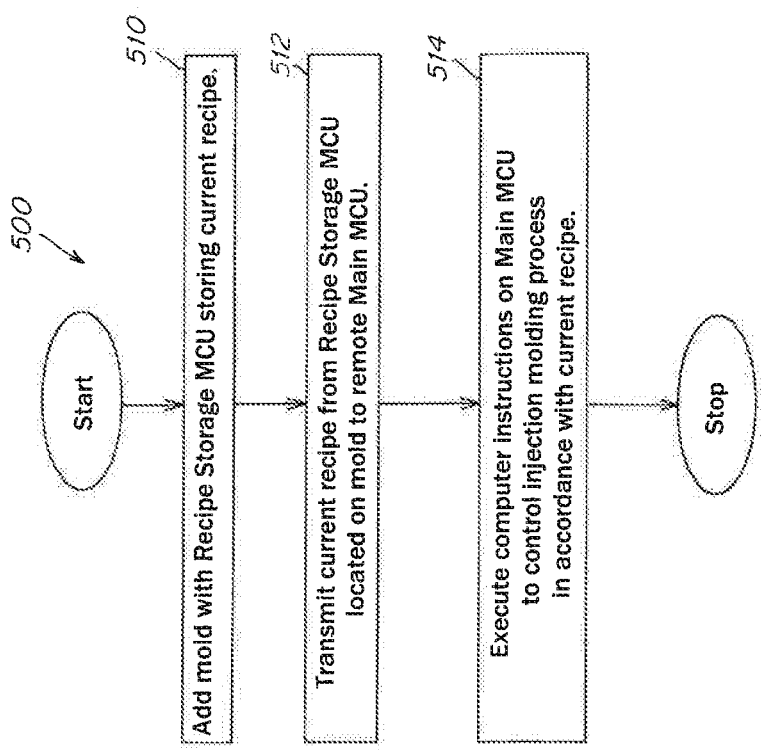
FIG. 9 is a flow chart illustrating one method of implementing the control system of FIG. 5.

FIG. 9 illustrates a further method embodiment 500. In a first step 510, a mold is added or changed having a recipe storage MCU located on the mold storing the current recipe. In a next step 512, the current recipe is transmitted from the recipe MCU located on the mold to the remote main MCU. In a next step 514, the main MCU executes computer instructions to control the injection molding process in accordance with the current recipe. Thus, the method illustrated in FIG. 9 would allow a mold operator, such as a night-shift operator, to change the mold without having to input which recipe to run. The control system (e.g., of FIG. 5) will automatically identify the mold and run the current recipe stored on the mold without any human operator input required.

Figure 11:
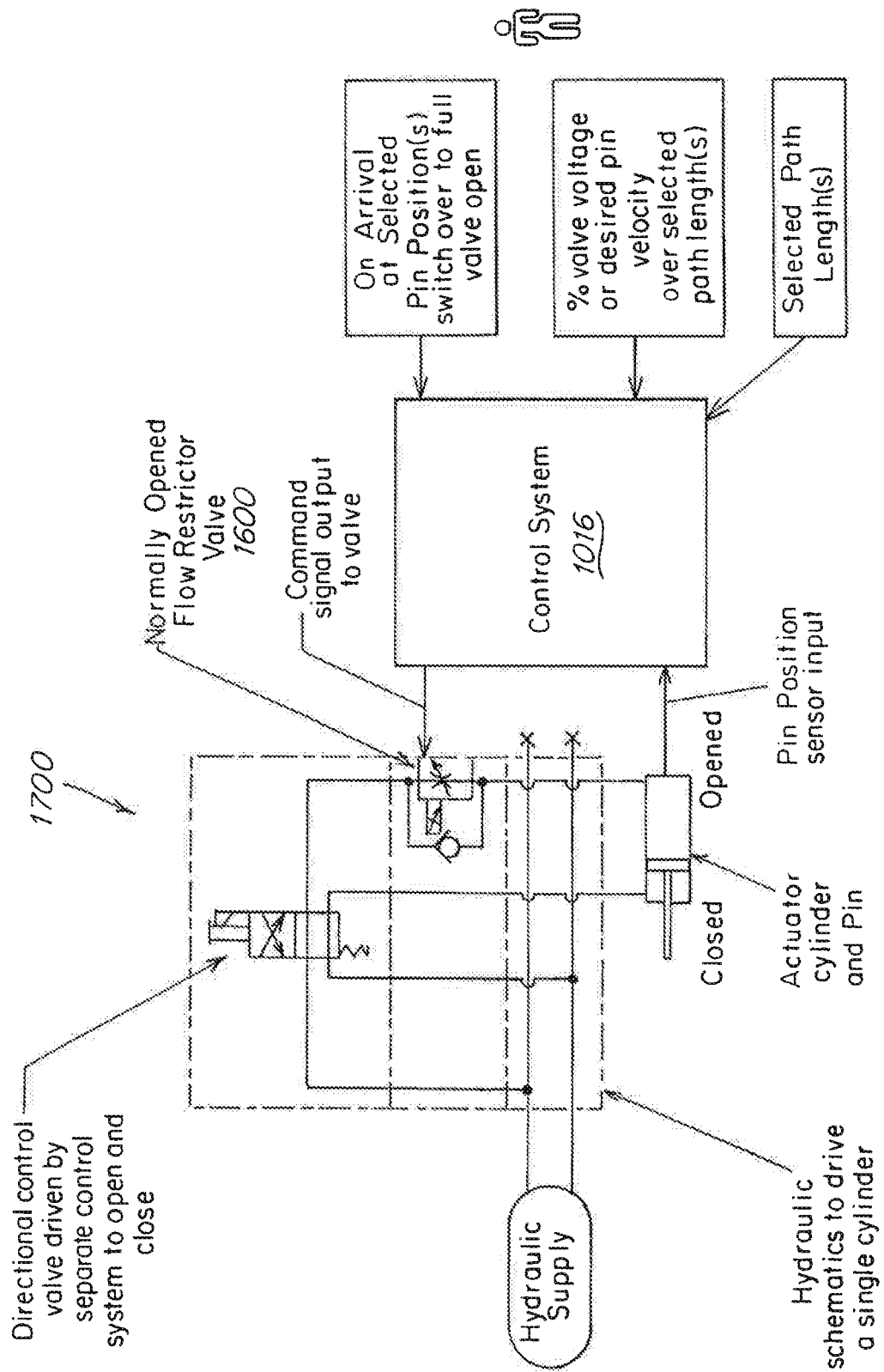
FIG. 11 is a schematic of one embodiment of a hydraulically actuated valve pin in which at least one port of an actuator is connected to a flow restrictor so as to restrict the flow of hydraulic drive fluid and slow the opening of the valve pin by a selected lessening of pin opening velocity by use of a controller interconnected to the flow restrictor, the controller enabling the user to select a percentage of predetermined full open position (maximum) velocity that the hydraulic drive supply to the actuator normally operates at full open velocity drive fluid pressure.

C2. Injection Molding Apparatus and Method (FIGS. 10-12)

FIG. 10 shows an injection molding system 1000, similar to system 10 illustrated in FIG. 2, with like components having the same reference numbers or labeled with a 1000 series of reference numbers. In the FIG. 10 embodiment a controller 1016 includes a flow control MCU 109 (as per FIG. 5) and a recipe storage system 1010 (with a recipe storage MCU 116 as per FIG. 5) is mounted on the mold 1002. In this example, a recipe of process parameters that are stored on the mold storage device 1010 are transmitted via a communication channel 1009 to the main MCU in controller 1016 for execution.

In FIG. 10, similar to FIG. 2, molten material F is fed from an injection molding machine (not shown) through a main inlet 1018 to a distribution channel 1019 of a manifold 1039. The distribution channel commonly feeds three separate nozzles 1020, 1022, 1024 which all commonly feed into a common cavity 1030 of a mold 1002 to make one molded part. The central nozzle 1022 is controlled by actuator 1940 and arranged so as to feed into cavity 1030 at an entrance point or gate that is disposed at about the center 1032 of the cavity. As shown, a pair of lateral nozzles 1020, 1024 feed into the mold cavity 1030 at gate locations that are distal 1034, 1036 to the center gate feed position 1032.

As shown in FIGS. 10A-10E, the injection cycle is a cascade process where injection is effected in a sequence from the center nozzle 1022 first and at a later predetermined time from the lateral nozzles 1020, 1024. As shown in FIG. 10A the injection cycle is started by first opening the pin 1040 of the center nozzle 1022 and allowing the fluid material F1 (typically polymer or plastic material) to flow up to a position in the cavity just before 1100b, the distally disposed entrance into the cavity of the lateral nozzle 1024. Once the fluid material has further travelled just past the entrance to nozzle 1024, at position 1100p, the center gate 1032 of the center nozzle 1022 is typically closed by pin 1040 as shown in FIG. 10B. The lateral gates 1034, 1036 are then opened by upstream withdrawal of lateral nozzle pins 1041, 1042 as shown in FIGS. 10B-10E. The rate of upstream withdrawal or travel velocity of lateral pins 1041, 1042 is controlled as described below.

In alternative embodiments, the center gate 1032 and associated actuator 1940 and valve pin 1040 can remain open at, during and subsequent to the times that the lateral gates 1034, 1036 are opened such that fluid material flows into cavity 1030 through both the center gate 1032 and one or both of the lateral gates 1034, 1036 simultaneously.

When the lateral gates 1034, 1036 are opened and fluid material F2 is allowed to first enter the mold cavity into the stream F1 that has been injected from center nozzle 1022 past gates 1034, 1036, the two streams F2 and F1 mix with each other. If the velocity of the fluid material F2 is too high, such as often occurs when the flow velocity of injection fluid material through gates 1034, 1036 is at maximum, a visible line or defect in the mixing of the two streams F1 and F2 will appear in the final cooled molded product at the areas where gates 1034,1036 inject into the mold cavity. By injecting F2 at a reduced flow rate for a relatively short period of time at the beginning when the gates 1034, 1036 are first opened and following the time when F2 first enters the flow stream F1, the appearance of a visible line or defect in the final molded product can be reduced or eliminated.

Figure 11A:
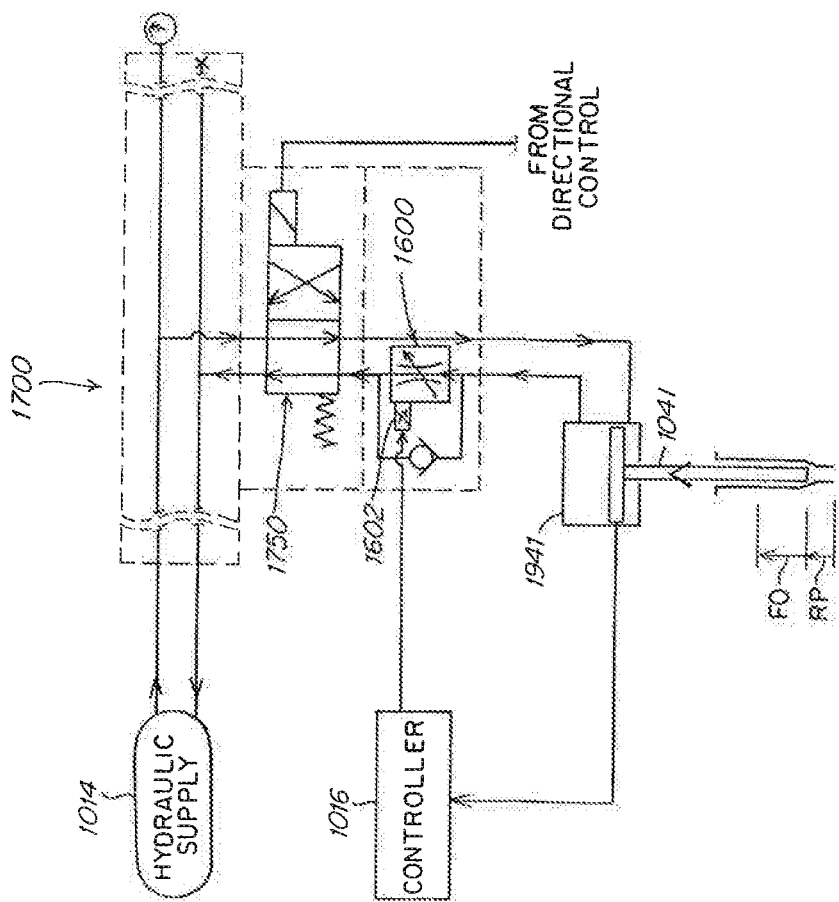
FIGS. 11A-11B are schematic cross-sectional views of the hydraulic valves and restrictors used in the system of FIG. 10.
Figure 11B:
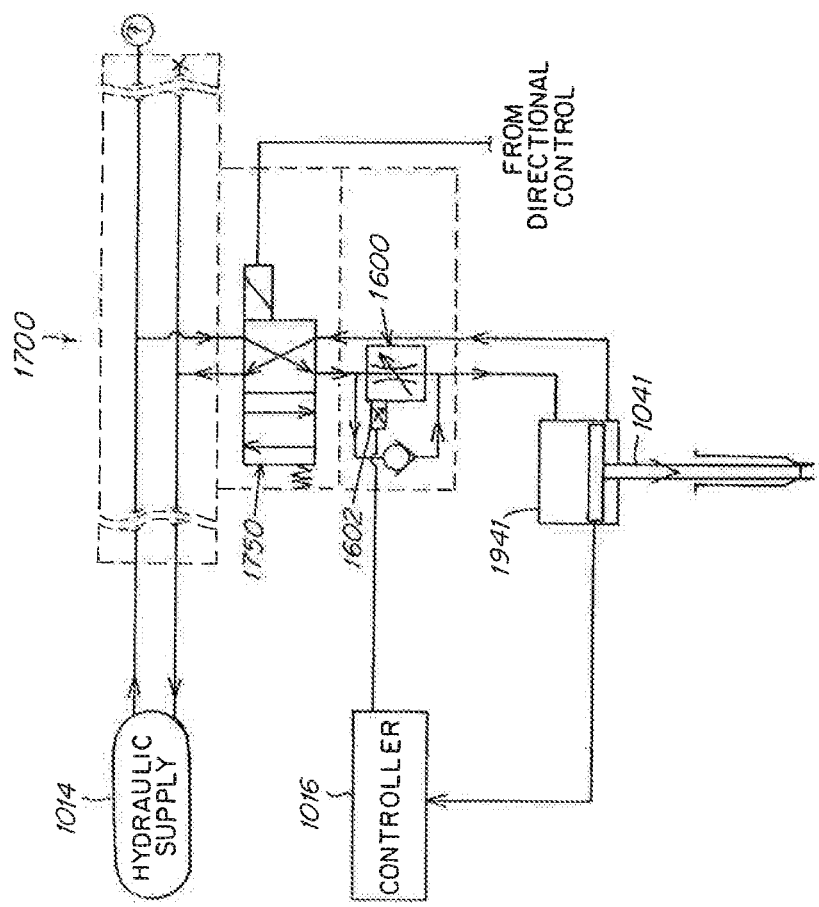
Figure 12C:
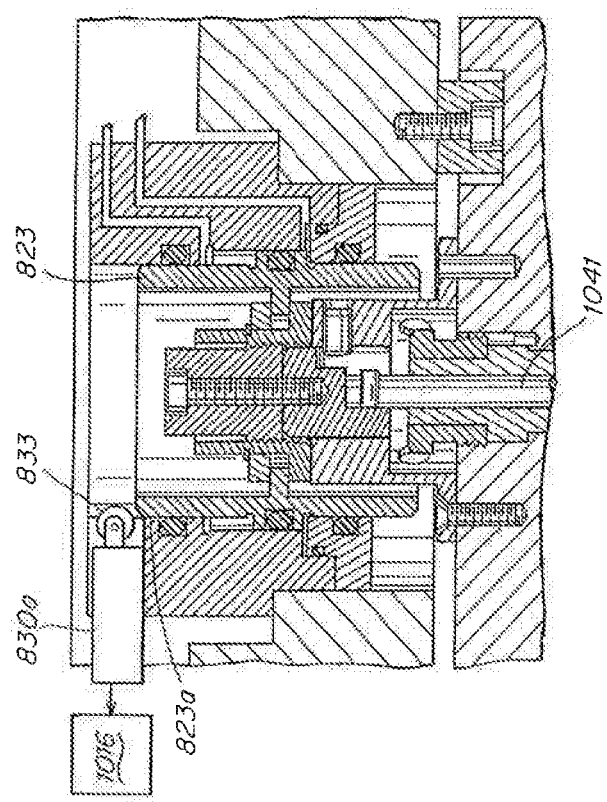
FIGS. 12C-12D show sensor embodiments using limit switches that detect and signal specific positions of the actuator that can be used to determine velocity, position and switchover to higher openness of the valve restrictor and/or upstream velocity of travel of the actuator and valve pin.
Figure 12D:
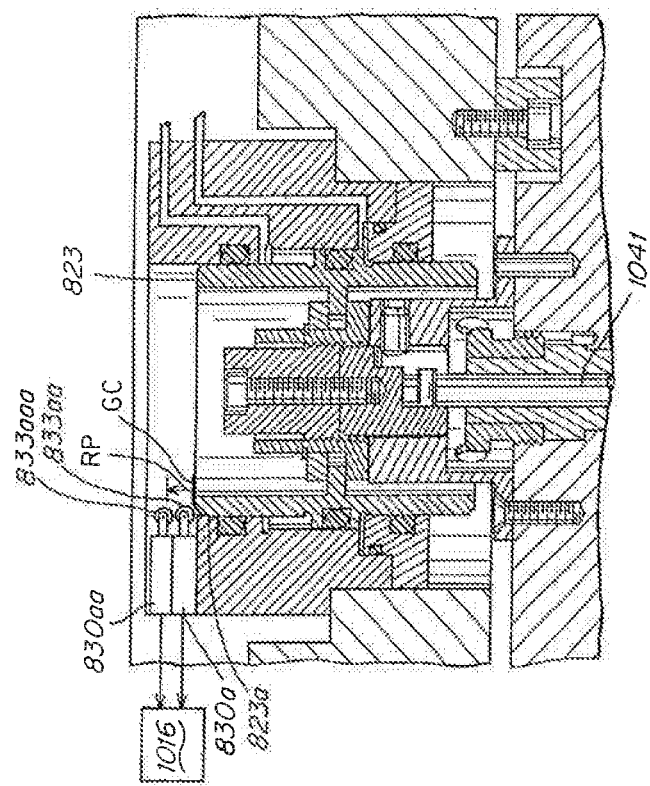
Figure 13A:
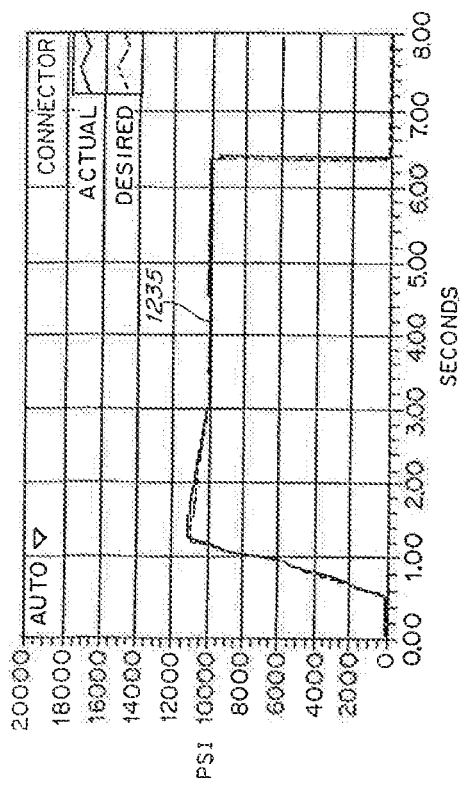
FIGS. 13A-13D are a series of graphs representing actual pressure (versus target pressure) measured in four injection nozzles coupled to a manifold, such as in the apparatus of FIG. 10.
Figure 13B:
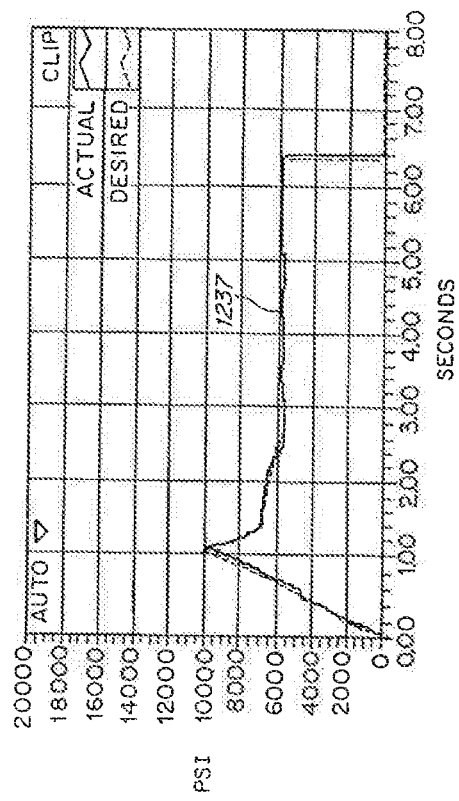
Figure 13C:
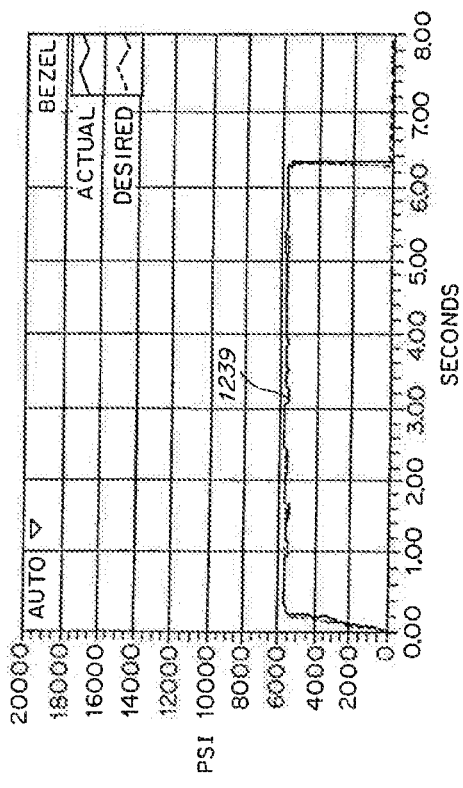
Figure 13D:
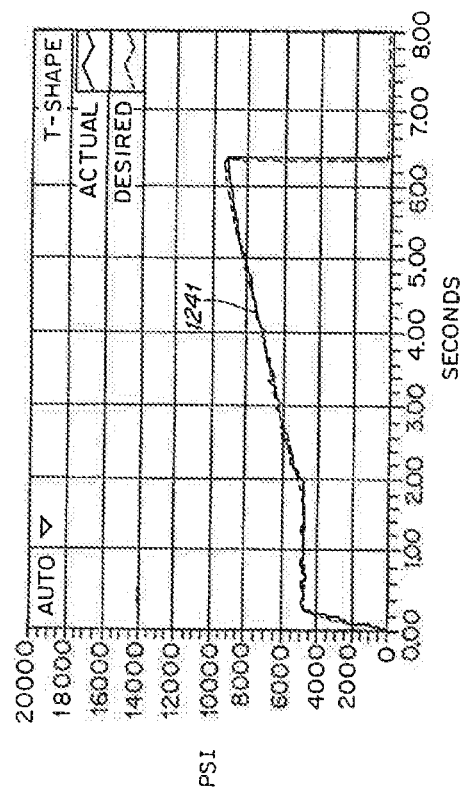

The rate or velocity of upstream withdrawal of valve pins 1040, 1041, 1042 starting from the closed position is controlled via controller 1016 (FIGS. 10 and 11) which controls the rate and direction of flow of hydraulic fluid from a drive system 1700 to actuators 1950, 1951, 1952. A more detailed description of the drive system 1700 and control system 1016 is shown in FIGS. 11 and 11A-11B, discussed below. Although fluid driven actuators are employed in the disclosed embodiments, actuators powered by an electric or electronic motor or drive source can alternatively be used as the actuator component. Another embodiment would have the controller dynamically control the movement of an actuator and associated valve pin in order to meet target pressure profiles based upon (closed loop) feedback received by the controller from a pressure sensor monitoring flow of the fluid material F in the system, upstream of the mold cavity. Yet another embodiment would have the controller trigger the opening and/or closing of an actuator and associated valve pin based upon a sensed pressure or temperature condition within the mold cavity.

As shown in FIGS. 11 and 11A-11B, a supply of hydraulic fluid 1014 is fed first through a directional control valve 1750 mechanism that switches the hydraulic fluid flow to the actuator cylinders in either of two directions: fluid out to withdraw the pin upstream, FIG. 11A, and fluid in to drive the pin downstream, FIG. 11B. At the beginning of an injection cycle the gate of a lateral valve 1034, 1036 is closed and the hydraulic system is in the directional configuration of FIG. 11B. When a cycle is started, the directional configuration of the directional valve 1750 of the hydraulic system 1700 is switched by controller 1016 to the configuration of FIG. 11A. The hydraulic system includes a flow restriction valve 1600 that can vary the rate of flow of hydraulic fluid to the actuator 1951 under the control of the controller 1016 to vary the rate of travel, upstream or downstream of the piston of the actuator 1951 which in turn controls the direction and rate of travel of pin 1041. The hydraulic system 1700 controls the direction and rate of travel of the pistons of actuators 1940 and 1942 in a similar manner.

A user can also program controller 1016 via data inputs (e.g., on a user interface 121 in FIG. 5) to instruct the hydraulic system 1700 to drive pins 1041, 1042 at an upstream velocity of travel that is reduced relative to a maximum velocity that the hydraulic system can drive the pins 1041, 1042 to travel. As described below, such reduced pin withdrawal rate or velocity is executed until a position sensor such as 1951, 1952 detects that an actuator 1941, 1942 or an associated valve pin 1041, 1042 (or another component), has reached a certain position such as the end point of a restricted flow path RP. A typical amount of time over which the pins are withdrawn at a reduced velocity is between about 0.01 and 0.10 second, the entire injection cycle time typically being between about 0.3 seconds and about 3 seconds, more typically between about 0.5 seconds and about 1.5 seconds.

FIG. 10 shows position sensors 1950, 1951, 1952 for sensing the position of their respective actuator cylinders (1940, 1941, 1942) and their associated valve pins (1040, 1041, 1042) and feeding such position information to controller 1016 for monitoring purposes. As shown, fluid material F is injected from an injection molding machine IMM into an input channel 1018 of a manifold and fed via runner 1019 further downstream into the bores (axial channels) 1042, 1044, 1046 of nozzles 1024, 1022 and ultimately downstream through the gates 1032, 1034, 1036. When the lateral pins 1041, 1042 are withdrawn upstream to a position where the tip end of the pins 1041, 1042 are in a fully upstream open FO position such as shown in FIG. 11D, the rate of flow of fluid material through the gates 1034, 1036 is at a maximum. However when the pins 1041, 1042 are initially withdrawn beginning from the closed gate position, FIG. 11A, to intermediate upstream positions, FIGS. 11B, 11C, a gap 1154, 1156 that restricts the velocity of fluid material flow is formed between the outer surfaces 1155 of the tip end of the pins 1044, 1046 and the inner surfaces 1254, 1256 of the gate areas of the nozzles 1024, 1020. The restricted flow gap 1154, 1156 remains small enough to restrict and reduce the rate of flow of fluid material 1153 through gates 1034, 1036 to a rate that is less than maximum flow velocity over a travel distance RP of the tip end of the pins 1041, 1042 going from closed to upstream as shown in FIGS. 10, 10B, 10C, 10E.

The trace or visible lines that appear in the body of a part that is ultimately formed within the cavity of the mold on cooling above can be reduced or eliminated by reducing or controlling the velocity of the pin 1041, 1042 opening or upstream withdrawal from the gate closed position to a selected intermediate upstream gate open position that is preferably 75% or more of the length of RP. RP can be about 1-8 mm in length and more typically about 2-6 mm and even more typically 2-4 mm in length.

The velocity of withdrawal of the valve pins 1041, 1042 is determined by regulation of the flow of hydraulic drive fluid that is pumped from a supply 1014 to the actuators 1941, 1942 through a flow restrictor valve 1600, FIGS. 10-11. When the flow restrictor valve 1600 is completely open, namely 100% open, allowing maximum flow of the pressurized hydraulic fluid to the actuator cylinders, the valve pins 1041, 1042 are driven at a maximum upstream travel velocity. The degree of openness of the flow restrictor valve is adjusted in response to sensing of position of a suitable component such as an actuator 1941, 1942 or associated valve pin to less than 100% open. Adjustment of the flow restrictor valve 1600 to less than 100% open thus reduces the rate and volume flow of pressurized hydraulic fluid to the actuator cylinders thus in turn reducing the velocity of upstream travel of the pins 1041, 1042 for the selected period of time. At the end of the travel or length of path RP, a position sensor signals the controller 1016, the controller 1016 determines that the end has been reached and the valve 1600 is opened to a higher velocity, typically to its 100% open position to allow the actuator pistons and the valve pins 1041, 1042 to be driven at maximum upstream velocity in order to reduce the cycle time of the injection cycle.

The valve 1600 typically comprises a restrictor valve that is controllably positionable anywhere between completely closed (0% open) and completely open (100% open). Adjustment of the position of the restrictor valve 1600 is typically accomplished via a source of electrical power that controllably drives an electromechanical mechanism that causes the valve to rotate such as a rotating spool that reacts to a magnetic or electromagnetic field created by the electrical signal output of the controller 1016, namely an output of electrical energy, electrical power, voltage, current or amperage the degree or amount of which can be readily and controllably varied by conventional electrical output devices. The electro-mechanism is controllably drivable to cause the valve 1600 to open or close to a degree of openness that is proportional to the amount or degree of electrical energy that is input to drive the electro-mechanism. The velocity of upstream withdrawal travel of the pins 1041, 1042 are in turn proportional to the degree of openness of the valve 1600.

FIGS. 12A-12D show various examples of position sensors (e.g., for use as sensors 1950-1952 in FIG. 10 and sensors 950-952 in FIG. 2), the mounting and operation of which are described in U.S. Patent Publication No. 2009/0061034, the disclosure of which is herein incorporated by reference in its entirety. The position sensor 800 of FIGS. 12A and 12B for example can track and signal the position of the piston of an actuator piston 823 continuously along its entire path of travel from which data a valve pin velocity can be continuously calculated over the length of RP via a spring loaded follower 802 that is in constant engagement with flange 804 during the course of travel of piston 823. Sensor 800 constantly sends signals to controller 1016 in real time to report the position of the valve pin (e.g., 1041) and its associated actuator (e.g., 1941). FIGS. 8C, 8D show alternative embodiments using position switches that detect position at specific individual positions of the actuator and its associated valve pin 1041. The FIG. 8C embodiment uses a single trip position switch 830a with trip mechanism 833 that physically engages with the piston surface 823a when the piston 823 reaches the position of the trip mechanism 833. The FIG. 8D embodiment shows the use of two separate position switches 830a, 830aa having sequentially spaced trips 833aa and 833aaa that report the difference in time or distance between each trip engaging surface 823a of the piston, the data from which can be used by controller 1016 to calculate velocity of the actuator based on the time of travel of the actuator from tripping one switch 830a and then tripping the next 830aa. In each embodiment the position switch can signal the controller 1016 when the valve pin 1041, 1042 has travelled to one or more selected intermediate upstream gate open positions between GC (gate closed) and RP so that the velocity of the pin can be adjusted to the selected or predetermined velocities determined by the user. As can be readily imagined other position sensor mechanisms can be used such as optical sensors, sensors that mechanically or electronically detect the movement of the valve pin or actuator or the movement of another component of the apparatus that corresponds to movement of the actuator or valve pin.

In alternative embodiments the controller can include a processor and instructions that receive the pin position information and signals from the position sensor and calculate the real time velocity of the pin from the pin position data in real time at one or more times or positions over the course of the pin travel through the RP path length and/or beyond. Typically such calculations of velocity are continuous throughout the cycle. In such an embodiment, the calculated pin velocity is constantly compared to a predetermined target profile of pin velocities and the velocity of the pin is adjusted in real time by the controller 1016 to conform to the profile. Such control systems are described in greater detail in for example U.S. Patent Publication No. 2009/0061034, the disclosure of which is herein incorporated by reference in its entirety.

As discussed above, control over the velocity of pin movement in an embodiment where the pin is driven by a hydraulic or pneumatic actuator is typically accomplished by controlling the degree of openness of the fluid restriction valve 1600, control over velocity and drive rate or position of valve 1600 being the same functions in terms of the instructions, processor design or computer software that carries out instructing and implementing the velocity or drive rate adjustment to the valve pin or actuator. Where the position sensing system senses the position of the pin or other component multiple times throughout the course of the pin or other component movement, and real time velocity can be calculated by the controller 1016, a program or instructions can be alternatively used to receive a velocity data input by the user to the controller 1016 as the variable to be stored and processed instead of a predetermined voltage or current input Where an actuator that comprises an electric motor is used as the drive mechanism for moving the valve pin 1041, 1042 instead of a fluid driven actuator, the controller 1016 can similarly be programmed to receive and process velocity data input as a variable for controlling the velocity or rate of drive of the electric actuator.

Figure 14:
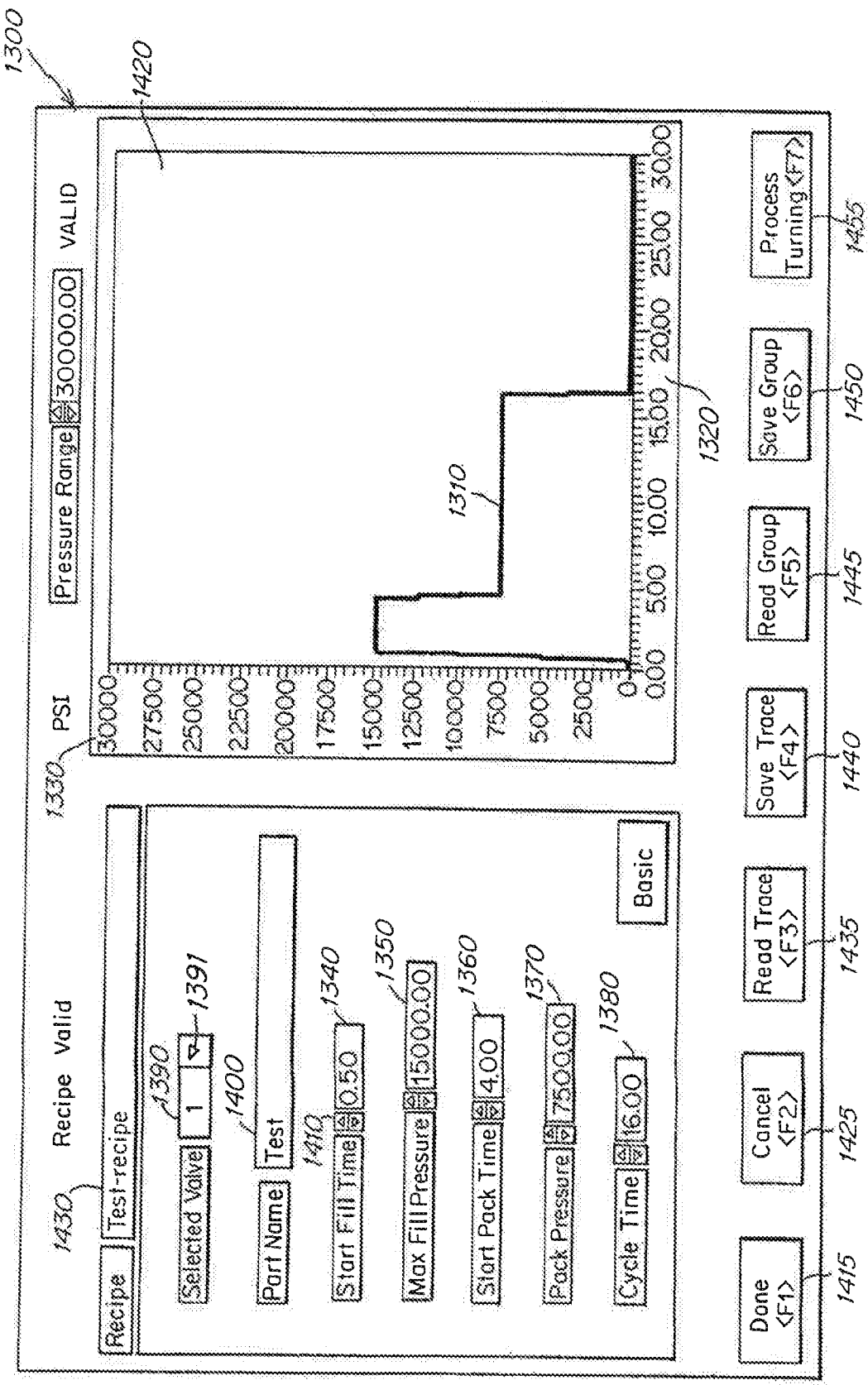
FIG. 14 shows an interactive screen display of a user interface, such as that shown in FIG. 10, which screen is used to display, create, edit and store target profiles.

C3. User Interface and Target Profiles (FIGS. 13-14)

FIGS. 13A-13D shows time versus pressure graphs (1235, 1237, 1239, 1241) of the pressure detected by four pressure transducers that monitor and measure the melt flow pressure associated with four nozzles mounted in a manifold block, such as the nozzles shown in FIG. 10. The output of the pressure transducers is coupled (transmitted) to the controller 1016.

The graphs of FIGS. 13A-13D are generated on a user interface (e.g., 121, 171 of FIG. 5), so that a user can observe the tracking of the actual pressure versus the target (desired) pressure during the injection cycle in real time, or after the cycle is complete. The four different graphs show four independent target pressure profiles ("desired") as emulated by the four individual nozzles. Different target profiles are desirable to uniformly fill different sized individual cavities associated with each nozzle, or to uniformly fill different sized sections of a single cavity. Graphs such as these can be generated with respect to any of the previous embodiments described herein.

The valve pin associated with graph 1235 is opened sequentially at 0.5 seconds after the valves associated with the other three graphs (1237, 1239 and 1241) were opened at 0.00 seconds. At approximately 6.25 seconds, at the end of the injection cycle, all four valve pins are back in the closed position. During injection (for example, 0.00 to 1.0 seconds in FIG. 13B) and pack (for example, 1.0 to 6.25 seconds in FIG. 13B) portions of the graphs, each valve pin is controlled to a plurality of positions to alter the pressure sensed by the pressure transducer associated therewith to track the target pressure.

Through the user interface, target profiles can be designed, and changes can be made to any of the target profiles using standard (e.g., windows-based) editing techniques. The profiles are then used by controller 1016 to control the position of the valve pin. For example, FIG. 14 shows an example of a profile creation and editing screen 1300 generated on a user interface.

Screen 1300 is generated by a windows-based application performed on the user interface, e.g., any of the user interfaces 21 shown in FIG. 5. Alternatively, this screen display could be generated on an interface associated with the controller (e.g., display screen 171 associated with controller 108 in FIG. 5). Interactive screen 1300 provides a user with the ability to create a new target profile or edit an existing target profile for any given nozzle and cavity associated therewith.

A profile 1310 includes (x, y) data pairs, corresponding to time values 1320 and pressure values 1330 which represent the desired pressure sensed by the pressure transducer for the particular nozzle being profiled. The screen shown in FIG. 14 is shown in a "basic" mode in which a limited group of parameters are entered to generate a profile. For example, in the foregoing embodiment, the "basic" mode permits a user to input start time displayed at 1340, maximum fill pressure displayed at 1350 (also known as injection pressure), the start of pack time displayed at 1360, the pack pressure displayed at 1370, and the total cycle time displayed at 1380.

The screen also allows the user to select the particular valve pin they are controlling displayed at 1390, and name the part being molded displayed at 1400. Each of these parameters can be adjusted independently using standard windows-based editing techniques such as using a cursor to actuate up/down arrows 1410, or by simply typing in values on a keyboard. As these parameters are entered and modified, the profile will be displayed on a graph 1420 according to the parameters selected at that time.

By clicking on a pull-down menu arrow 1391, the user can select different nozzle valves in order to create, view or edit a profile for the selected nozzle valve and cavity associated therewith. Also, a part name 1400 can be entered and displayed for each selected nozzle valve.

The newly edited profile can be saved in computer memory individually, or saved as a group of profiles for a group of nozzles that inject into a particular single or multi-cavity mold. The term "recipe" is used to describe one or more of profiles for a particular mold and the name of the particular recipe is displayed at 1430 on the screen icon.

To create a new profile or edit an existing profile, first the user selects a particular nozzle valve of the group of valves for the particular recipe group being profiled. The valve selection is displayed at 1390. The user inputs an alpha/numeric name to be associated with the profile being created; for family tool molds this may be called a part name displayed at 1400. The user then inputs a start fill time displayed at 1340 to specify when injection starts. A delay can be entered with particular valve pins to sequence the opening of the valve pins and the injection of melt material into different gates of a mold.

The user then inputs the fill (injection) pressure displayed at 1350. In the basic mode, the ramp from zero pressure to max fill pressure is a fixed time, for example, 0.3 seconds. The user next inputs the start pack time to indicate when the pack phase of the injection cycle starts. The ramp from the filling phase to the packing phase is also fixed time in the basic mode, for example, 0.3 seconds.

The final parameter is the cycle time which is displayed at 1380 in which the user specifies when the pack phase (and the injection cycle) ends. The ramp from the pack phase to zero pressure may be instantaneous when a valve pin is used to close the gate, or slower in a thermal gate due to the residual pressure in the cavity which will decay to zero pressure once the part solidifies in the mold cavity.

User input buttons 1415 through 1455 are used to save and load target profiles. Button 1415 permits the user to close the screen. When this button is clicked, the current group of profiles will take effect for the recipe being profiled. Cancel button 1425 is used to ignore current profile changes and revert back to the original profiles and close the screen. Read Trace button 1435 is used to load an existing and saved target profile from memory. The profiles can be stored in memory contained in one or more of the operator interface 121, the main MCU 109, and the recipe storage MCU 116. Save trace button 1440 is used to save the current profile. Read group button 1445 is used to load an existing recipe group. Save group button 1450 is used to save the current group of target profiles for a group of nozzle valve pins. The process tuning button 1455 allows the user to change the settings (for example, the gains) for a particular nozzle valve in a control zone. Also displayed is a pressure range 1465 for the injection molding application.

While specific embodiments have been shown and described, it will be apparent that many modifications can be made thereto. For example, in one embodiment the controller is mounted on a hydraulic power unit. In one embodiment, the flow control MCU receives, displays and/or records a signal from an electronic mold counting sensor for correlating detected pin motion data to the recipe data for a given molding cycle. In one embodiment, the system includes a plurality of flow control MCU's each controlling a corresponding one of a plurality of pins. In one embodiment, the flow control MCU transmits signals to an electric motor for controlling one or more of pin position and rate of pin movement. In one embodiment, both the recipe MCU and the flow control MCU are mounted to the mold. In one embodiment, the controller is contained in a physical box which is mounted to the injection machine and/or placed near the injection machine. In one embodiment, the controller associates (compares) the recipe data to data collected during one injection cycle. In one embodiment, each valve pin has its own profile per injection cycle, and the recipe is a collection of such profiles for a plurality of pins.

In one embodiment, a mold having no recipe or a non-approved (not current or previously tested) recipe stored in the recipe storage MCU, is mounted to the machine. An operator can then create a recipe by testing different inputs to the controller, e.g., adjusting the rate of speed and/or position of one or more pins. When the user is satisfied with the parts being produced in the mold or with data and/or signals received from the mold (e.g., temperature and/or pressure), the operator then stores a copy of the newly created recipe by transmitting (direct or indirectly) the new recipe for storage on the recipe storage MCU. The main MCU of the controller stores a local copy of the new recipe, and runs the recipe (executes instructions implementing the recipe) for the mold. Then later, if this first mold is removed and a new mold is mounted to the machine, where the new mold has a proper recipe already stored on the new mold MCU, the controller can then immediately run the new recipe for the new mold on the machine. If not, the operator can again create a new recipe for the new mold, as previously described.

The recipe data typically comprises a profile of values of a condition of the injected polymer material or a condition or position of a selected component of the injection molding apparatus that is specified to occur at each point in time over the course or duration of an injection cycle when a part is produced in the mold cavity. Thus a profile defines a set of conditions, events or positions to which the injection material or the component of the apparatus is adjusted to attain over the course of a particular injection cycle. Typical injection material conditions that can be specified and controlled are pressure of the injection material at selected positions within a flow channel of the manifold, within an injection nozzle or within the mold cavity. Typical conditions or positions of components of the apparatus that can be controlled and comprise a profile are the position of the valve pin, the position of the screw of the barrel of the injection molding machine and position of an actuator piston. Such profiles and recipes are disclosed in detail in for example U.S. Pat. Nos. 6,464,909 and 8,016,581 and 7,597,828, the disclosures of which are incorporated by reference in their entirety as if fully set forth herein.

D. Controller or Computing System (FIG. 15)

Figure 15:
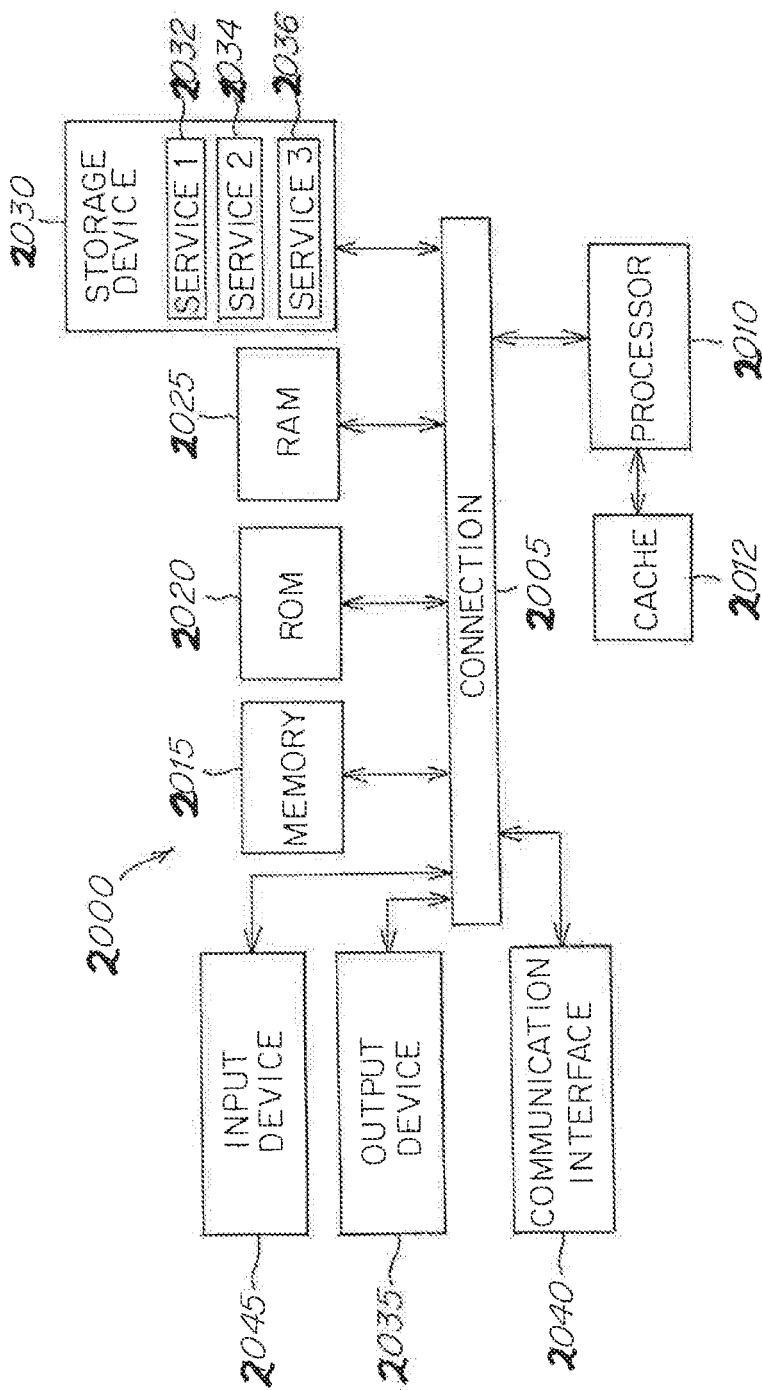
FIG. 15 is a schematic illustration of a computing apparatus that can be used to implement a controller.

FIG. 15 illustrates an example of a controller or computing system architecture 2000 wherein the components of the system 2000 are in communication with each other using a connection 2005. Connection 2005 can be a physical connection via a bus, or direct connection into processor 2010 such as in a chipset architecture. Connection 2005 can also be a virtual connection, networked connection, or logical connection. The connection can be wired or wireless (such as a Bluetooth connection).

In some cases, the system 2000 is a distributed system, wherein the functions described with respect to the components herein can be distributed within a datacenter, multiple datacenters, geographically, etc. In some embodiments, one or more of the described system components represents many such components each performing some or all of the function for which the component is described. In some embodiments, the components described herein can be physical or virtual devices.

Example system 2000 includes at least one processing unit (CPU or processor) 2010 and a connection 2005 that couples various system components including the system memory 2015, such as read only memory (ROM) 2020 and random access memory (RAM) 2025 to the processor 2010. The system 2000 can include a cache of high-speed memory 2012 connected directly with, in close proximity to, or integrated as part of the processor 2010.

The processor 2010 can include any general purpose processor and a hardware service or software service, such as service-1 2032, service-2 2034, and service-3 2036 stored in storage device 2030, configured to control the processor 1010 as well as a special-purpose processor where software instructions are incorporated into the actual processor design. The processor 2010 may essentially be a completely self-contained computing system, containing multiple cores or processors, a bus, memory controller, cache, etc. A multi-core processor may be symmetric or asymmetric.

To enable user interaction with the computing device 2000, an input device 2045 can represent any number of input mechanisms, such as a microphone for speech, a touch-sensitive screen for gesture or graphical input, keyboard, mouse, motion input, speech and so forth. An output device 2035 can also be one or more of a number of output mechanisms known to those of skill in the art. In some instances, multimodal systems can enable a user to provide multiple types of input to communicate with the computing device 2000. The communications interface 2040 can generally govern and manage the user input and system output. There is no restriction on operating on any particular hardware arrangement and therefore the basic features here may easily be substituted for improved hardware or firmware arrangements as they are developed.

Storage device 2030 can be a non-volatile memory and can be a hard disk or other types of computer readable media which can store data that are accessible by a computer, such as magnetic cassettes, flash memory cards, solid state memory devices, digital versatile disks, cartridges, random access memories (RAMs) 2025, read only memory (ROM) 2020, and hybrids thereof.

The storage device 2030 can include code that when executed by the processor 2010, causes the system 2000 to perform a function. A hardware service that performs a particular function can include the software component stored in a computer-readable medium in connection with the hardware components, such as the processor 2010, bus 2005, output device 2035, and so forth, to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Claim language reciting "at least one of" refers to at least one of a set and indicates that one member of the set or multiple members of the set satisfy the claim. For example, claim language reciting "at least one of A and B" means A, B, or A and B.

While specific embodiments of the present invention have been shown and described, it will be apparent that many modifications can be made thereto without departing from the scope of the invention. Accordingly, the invention is not limited by the foregoing description.

The invention claimed is:

1. A method of performing an injection molding cycle in an injection molding apparatus (10) comprising a manifold (40) that receives an injection fluid (F), the manifold distributing the injection fluid to a fluid delivery channel (44) that delivers the injection fluid under an injection pressure to a gate (34) of a mold cavity (30), and a valve pin (1041) having an axis (A) and a tip end (1142), the valve pin being slidably mounted for movement along the axis (A) within the fluid delivery channel (44), the valve pin being drivably interconnected to an actuator (941) in an arrangement wherein the actuator is adapted to drive the valve pin (1041) upstream and downstream along the axis (A) and drive the tip end (1142) of the valve pin upstream and downstream between a first closed position (GC) where the tip end of the valve pin obstructs the gate (34) to prevent the injection fluid from flowing into the cavity (30), a full open position (FOP) where the injection fluid material flows freely without restriction from the tip end of the pin through the gate, and one or more intermediate positions (RP, RP3) between the first closed position and the full open position wherein the tip end of the valve pin restricts flow of the injection fluid along at least a portion of the length of the drive path extending between the first closed position and the intermediate position, the method comprising steps of:
 a) first controllably operating the actuator to drive the valve pin upstream beginning from the first closed position (50) to be moved to and held in a first selected position (51) for a first selected period of time during the course of an injection cycle, the first selected position (51) being the full open position, wherein the valve pin is driven upstream from the first closed position (50) to the first selected position (51) at a maximum rate of travel at which the actuator is capable of driving the valve pin;
 b) second controllably operating the actuator to drive the valve pin, during the injection cycle, downstream beginning from the first selected position (51) to be moved to and held in a second closed position (52) for a second selected period of time, wherein the drive pin is driven downstream from the first selected position (51) to the second closed position (52) at a maximum rate of travel at which the actuator is capable of driving the valve pin;
 c) third controllably operating the actuator to drive the valve pin, during the injection cycle, upstream beginning from the second closed position (52) to be moved to and held in a second selected position (53) for a third selected period of time, the second selected position being an intermediate position or the full open position, wherein the valve pin is driven upstream from the second closed position (52) to the second selected position (53) at a reduced rate which is less than the maximum rate of travel at which the actuator is capable of driving the valve pin for at least a portion of the upstream travel from the second closed position (52) to the second selected position (53); and d) fourth controllably operating the actuator to drive the valve pin, during the injection cycle, downstream beginning from the second selected position (53) to be moved to a third closed position (54).

2. A method according to claim 1, wherein the second selected position (53) is an intermediate position.

3. A method according to claim 1, wherein the second selected position (53) is the full open position.

4. A method according to claim 1, wherein step d) comprises driving the valve pin downstream from the second selected position (53) to the third closed position (54) at a maximum rate of travel at which the actuator is capable of driving the valve pin.

5. A method according to claim 1, wherein the second selected position (53) in which the valve pin is held is a position at which pressure of the injection fluid is a pack pressure.

6. An injection molding apparatus (10) comprising a manifold (40) that receives an injection fluid (F) from an injection molding machine, the manifold distributing the injection fluid to a fluid delivery channel (44) that delivers the injection fluid under an injection pressure to a gate (32) of a mold cavity (30), and a valve pin (1041) having an axis (A) and a tip end (1142), the valve pin being slidably mounted for movement along the axis (A) within the fluid delivery channel (44), wherein the valve pin (1041) is interconnected to an actuator (941) in an arrangement wherein the actuator is adapted to drive the valve pin (1041) upstream and downstream along the axis and to drive the tip end (1142) of the valve pin upstream and downstream between a first closed position (GC) where the tip end of the valve pin obstructs the gate to prevent the injection fluid from flowing into the cavity, a full open position (FOP) where the injection fluid material flows freely without restriction from the tip end of the pin through the gate, and one or more intermediate positions (RP, RP2) between the first closed position and the full open position wherein the tip end of the valve pin restricts flow of the injection fluid along at least a portion of the length of the drive path extending between the first closed position and the intermediate position, the apparatus including a controller (16) with instructions to first controllably operate the actuator to drive the valve pin upstream beginning from the first closed position (50) to be moved to and held in a first selected position (51) for a first selected period of time during the course of an injection cycle, the first selected position (51) being the full open position, wherein the instructions to the first controllably operate comprise instructions to drive the valve pin upstream from the first closed position (50) to the first selected position (51) at a maximum rate of travel at which the actuator is capable of driving the valve pin;

the controller including instructions to second controllably operate the actuator to drive the valve pin, during the injection cycle, downstream beginning from the first selected position (51) to be moved to and held in a second closed position (52) for a second selected period of time, wherein the instructions to second controllably operate comprise instructions to drive the valve pin downstream from the first selected position (51) to the second closed position (52) at a maximum rate of travel at which the actuator is capable of driving the valve pin;

the controller including instructions to third controllably operate the actuator to drive the valve pin, during the injection cycle, upstream beginning from the second closed position (52) to be held in a second selected position (53) for a third selected period of time, the second selected position (53) being an intermediate position or the full open position, wherein instructions to third controllably operate comprise instructions to drive the valve pin upstream from the second closed position (52) to the second selected position (53) at a reduced rate which is less than the maximum rate of travel at which the actuator is capable of driving the valve pin for at least a portion of the upstream travel from the second closed position (52) to the second selected position (53);

the controller including instructions to fourth controllably operate the actuator to drive the valve pin, during the injection cycle, downstream beginning from the second selected position (53) to a third closed position (54).

7. An apparatus according to claim 6, wherein the second selected position (53) is an intermediate position.

8. An apparatus according to claim 6, wherein the second selected position (53) is the full open position.

9. An apparatus according to claim 6, wherein the instructions to fourth controllably operate comprise instructions to drive the valve pin downstream from the second selected position (53) to the third closed position (54) at a maximum rate of travel at which the actuator is capable of driving the valve pin.

10. An apparatus according to claim 6, wherein the second selected position (53) in which the valve pin is held is a position at which pressure of the injection fluid is a pack pressure.

11. An apparatus according to claim 6, wherein the actuator comprises an electrically powered motor or electric motor or a hydraulic or pneumatic actuator.

* * * * *